(12) United States Patent
Song

(10) Patent No.: US 12,216,881 B2
(45) Date of Patent: *Feb. 4, 2025

(54) METHOD FOR DISPLAYING APPLICATION ICON AND ELECTRONIC DEVICE

(71) Applicant: HUAWEI TECHNOLOGIES CO., LTD., Guangdong (CN)

(72) Inventor: Lang Song, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,200

(22) Filed: Jun. 6, 2023

(65) Prior Publication Data

US 2023/0315256 A1 Oct. 5, 2023

Related U.S. Application Data

(63) Continuation of application No. 17/837,994, filed on Jun. 10, 2022, now Pat. No. 11,762,529, which is a
(Continued)

(30) Foreign Application Priority Data

Dec. 13, 2019 (CN) .......................... 201911284477.6

(51) Int. Cl.
  *G06F 3/04817* (2022.01)
  *G06F 3/04812* (2022.01)
  *G06F 9/451* (2018.01)

(52) U.S. Cl.
  CPC ...... *G06F 3/04817* (2013.01); *G06F 3/04812* (2013.01); *G06F 9/451* (2018.02)

(58) Field of Classification Search
  CPC ...... G06V 10/751; G06V 40/16; G06V 10/44; G06F 3/04842; G06F 3/0488; G06F 3/04817; G06F 3/04812; G06F 9/451
  See application file for complete search history.

(56) References Cited

U.S. PATENT DOCUMENTS 5,649,188 A 7/1997 Nomura et al.
9,720,564 B1 8/2017 Vinna et al.
(Continued)

FOREIGN PATENT DOCUMENTS

CN 1425151 A 6/2003
CN 102147697 A 8/2011
(Continued)

*Primary Examiner* — Tadesse Hailu
(74) *Attorney, Agent, or Firm* — Leydig, Voit & Mayer, Ltd.

(57) ABSTRACT

A method and device for operating an application icon are provided, to prompt a user where a currently operated application icon is located. The method includes: displaying a first screen page of a desktop, wherein the first screen page comprises N application icons, the N application icons comprise a first application icon and at least one first-layer application icon, and the first-layer application icon is located around the first application icon and adjacent to the first application icon; and the first-layer application icon comprises a foreground layer and a background layer; and receiving an operation of a user related to the first application icon; and in response to the operation, displaying the at least one first-layer application icon in a first display manner, wherein the first display manner comprises that a foreground layer of the at least one first-layer application icon moves relative to the first application icon.

18 Claims, 36 Drawing Sheets

Related U.S. Application Data continuation of application No. PCT/CN2020/133663, filed on Dec. 3, 2020.

(56) References Cited

U.S. PATENT DOCUMENTS

| | | | |
|---|---|---|---|
| 9,927,953 B2* | 3/2018 | Kang | G06F 3/0482 |
| 10,452,178 B2* | 10/2019 | Cho | G06F 3/0487 |
| 10,802,682 B2* | 10/2020 | Cheng | G06F 3/04883 |
| 11,675,476 B2* | 6/2023 | Dascola | G06F 3/04817 |
| | | | 715/863 |
| 11,698,712 B2* | 7/2023 | Arellano | G06F 3/04883 |
| | | | 455/411 |
| 11,750,767 B2* | 9/2023 | Charlton | G11B 27/34 |
| | | | 348/333.01 |
| 11,809,700 B2* | 11/2023 | Chaudhri | H04N 7/15 |
| 2003/0007017 A1 | 1/2003 | Laffey et al. | |
| 2005/0120306 A1 | 6/2005 | Klassen et al. | |
| 2009/0122018 A1* | 5/2009 | Vymenets | G06F 3/0488 |
| | | | 345/173 |
| 2009/0289917 A1* | 11/2009 | Saunders | G06F 3/0485 |
| | | | 345/173 |
| 2010/0269040 A1* | 10/2010 | Lee | G06F 3/0486 |
| | | | 715/702 |
| 2011/0035691 A1 | 2/2011 | Kim | |
| 2012/0162261 A1 | 6/2012 | Kim et al. | |
| 2012/0188275 A1 | 7/2012 | Shimazu et al. | |
| 2013/0132906 A1 | 5/2013 | Siurumaa et al. | |
| 2013/0227476 A1* | 8/2013 | Frey | G06F 3/0482 |
| | | | 715/810 |
| 2013/0305187 A1 | 11/2013 | Phillips et al. | |
| 2014/0189527 A1 | 7/2014 | Kruglick | |
| 2014/0337770 A1* | 11/2014 | Sasaki | G06F 3/0484 |
| | | | 715/762 |
| 2015/0089407 A1* | 3/2015 | Suzuki | G06F 3/04842 |
| | | | 715/834 |
| 2015/0095828 A1 | 4/2015 | Iida | |
| 2016/0105475 A1* | 4/2016 | Goodman | G06F 3/0487 |
| | | | 715/810 |
| 2016/0370982 A1 | 12/2016 | Penha et al. | |
| 2017/0124990 A1 | 5/2017 | Lee et al. | |
| 2017/0192622 A9 | 7/2017 | Fujimoto et al. | |
| 2017/0235436 A1* | 8/2017 | Hooton | G06F 3/04817 |
| | | | 705/7.11 |
| 2018/0349481 A1 | 12/2018 | Carlisle et al. | |
| 2019/0095068 A1* | 3/2019 | Suzuki | G06F 3/0485 |
| 2019/0095077 A1* | 3/2019 | Mori | G06F 1/1626 |
| 2020/0348823 A1 | 11/2020 | Cheng | |

FOREIGN PATENT DOCUMENTS

| | | |
|---|---|---|
| CN | 102541440 A | 7/2012 |
| CN | 102929479 A | 2/2013 |
| CN | 105871398 A | 8/2016 |
| CN | 106325649 A | 1/2017 |
| CN | 106325650 A | 1/2017 |
| CN | 108319406 A | 7/2018 |
| CN | 110262677 A | 9/2019 |
| CN | 112256165 A | 1/2021 |
| EP | 2469390 A2 | 6/2012 |
| JP | 2002261918 A | 9/2002 |
| JP | 2012208633 A | 10/2012 |
| JP | 2017534934 A | 11/2017 |
| KR | 20110014040 A | 2/2011 |
| KR | 20120023458 A | 3/2012 |
| RU | 2638725 C1 | 12/2017 |
| RU | 2659494 C2 | 7/2018 |
| WO | 2011105876 A2 | 9/2011 |

* cited by examiner

METHOD FOR DISPLAYING APPLICATION ICON AND ELECTRONIC DEVICE

CROSS-REFERENCE TO RELATED APPLICATIONS

This application is a continuation of U.S. patent Ser. No. 17/837,994, filed on Jun. 10, 2022, which is a continuation of International Application No. PCT/CN2020/133663, filed on Dec. 3, 2020, which claims priority to Chinese Patent Application No. 201911284477.6, filed on Dec. 13, 2019. All of the aforementioned applications are hereby incorporated by reference in their entireties.

TECHNICAL FIELD

Embodiments of this application relate to the field of terminal technologies, and in particular, to a method for displaying an application icon, and an electronic device.

BACKGROUND

One or more applications are usually installed in an electronic device such as a mobile phone, and a user may operate these applications to implement abundant application functions. Generally, an application icon of an application is used as an entry for entering the application, and may be displayed in an interface such as a home screen, a leftmost screen, a drop-up menu, or a drop-down menu of the mobile phone.

To enable the user to obtain better human-machine interaction experience during the use of the mobile phone, the mobile phone may display, in a specific display manner, an application icon currently interacting with the user. For example, when the user taps an application icon on the home screen, the mobile phone may deepen a color of the application icon, and reduce a size of the application icon, so as to prompt the user that the application icon is a currently operated icon.

However, when the user operates the application icon, a finger of the user may obstruct the application icon. Therefore, even if the mobile phone displays the application icon in a specific display manner, the mobile phone cannot well prompt the user with a specific position of the currently operated application icon, and a prompt effect for the user is not obvious.

SUMMARY

This application provides a method for displaying an application icon, and an electronic device, so as to prompt a user with a position of a currently operated application icon through changes of surrounding icons, thereby enhancing guidance for the user.

To achieve the foregoing objective, this application uses the following technical solutions.

According to a first aspect, this application provides a method for displaying an application icon, including: displaying a first screen page of a home screen, where the first screen page includes application icons of N (N is an integer greater than or equal to 2) applications; receiving a start operation (for example, tapping a first application icon) performed by a user on the first application icon on the first screen page, where the first application icon is one of the application icons of the N applications; and further, in response to the start operation, displaying a first layer of application icons in a first display manner by an electronic device. The first layer of application icons are located around the first application icon and adjacent to the first application icon, and the first display manner means that the first layer of application icons move toward the first application icon, so as to simulate a visual effect that application icons around the first application icon are attracted by the first application icon. After the first layer of application icons are displayed in the first display manner, an application interface of a first application corresponding to the first application icon may be displayed, that is, the first application is started.

To be specific, when the user enters a start operation for an application icon on the home screen, the electronic device may display a display effect that application icons around the application icon are attracted to and approach the currently operated application icon, so as to prompt, through changes of the surrounding icons, the user to quickly find a specific position of the currently operated application icon on the home screen, thereby enhancing guidance for the user.

In a possible implementation, the first layer of application icons include a first foreground-layer icon and a first background-layer icon, and the first foreground-layer icon is located on the first background-layer icon. That the first layer of application icons move toward the first application icon specifically includes: the first foreground-layer icon moves relative to the first background-layer icon toward the first application icon. For example, when the first background-layer icon is fixed, the first foreground-layer icon may be moved toward the first application icon. For another example, when the first foreground-layer icon is fixed, the first background-layer icon may be moved away from the first application icon. For still another example, the first background-layer icon and the first foreground-layer icon may move together toward the first application icon, but with a moving speed of the first foreground-layer icon greater than a moving speed of the first background-layer icon.

In a possible implementation, when the first foreground-layer icon moves relative to the first background-layer icon toward the first application icon, the first foreground-layer icon may be further compressed.

In a possible implementation, when the first foreground-layer icon moves relative to the first background-layer icon toward the first application icon, the first background-layer icon may be further compressed. When both the first background-layer icon and the first foreground-layer icon are compressed, a compression ratio of the first background-layer icon may be equal to or less than a compression ratio of the first foreground-layer icon.

In this way, when the user starts the first application icon on the home screen, a visual effect that application icons around the first application icon all move toward or are compressed toward the first application icon may be presented on the home screen. Therefore, the home screen is simulated as an elastic net, in which the icons around the first application icon are pulled by elastic force to approach and be attracted to the first application icon, so as to guide and prompt the user that the start operation is currently performed on the first application icon.

Alternatively, in the first display manner, the electronic device may move the application icons around the first application icon, so that the application icons around the first application icon approach the first application icon. In this case, a foreground-layer icon and a background-layer icon of the application icon do not move relative to each other.

In a possible implementation, the application icons of the N applications further include a second layer of application icons, the second layer of application icons are adjacent to the first layer of application icons, the second layer of application icons includes a second foreground-layer icon and a second background-layer icon, and the second foreground-layer icon is located on the second background-layer icon. In this case, in response to the foregoing start operation, the electronic device may further move the second foreground-layer icon relative to the second background-layer icon toward the first application icon, where a distance by which the second foreground-layer icon moves relative to the second background-layer icon toward the first application icon is less than a distance by which the first foreground-layer icon moves relative to the first background-layer icon toward the first application icon.

In a possible implementation, when the second foreground-layer icon is moved relative to the second background-layer icon toward the first application icon, the second foreground-layer icon may be further compressed, where a compression ratio of the second foreground-layer icon is less than the compression ratio of the first foreground-layer icon.

In other words, in a scenario of starting an application, compression and movement effects to different extents may be presented for different application icons based on distances between the first application icon and the application icons around the first application icon.

In a possible implementation, after the first layer of application icons are displayed in the first display manner, and before the application interface of the first application is displayed, the method further includes: resetting a position of the first foreground-layer icon, so that the first application icon is restored to a default position and size on the home screen.

In a possible implementation, each of the application icons of the N applications includes a foreground-layer icon and a background-layer icon. In this case, after the electronic device displays the application interface of the first application, the method further includes: redisplaying the first screen page; receiving a sliding operation performed by the user on a redisplayed first screen page; and in response to the sliding operation, the electronic device may display the application icons of the N applications in a second display manner. The second display manner means that the foreground-layer icon moves relative to the background-layer icon along a direction of the sliding operation, or when the foreground-layer icon moves relative to the background-layer icon along the direction of the sliding operation, the foreground-layer icon is compressed. After the application icons of the N applications are displayed in the second display manner, the electronic device may display a second screen page, where the second screen page is adjacent to the first screen page.

In other words, when the electronic device performs page turning on the home screen in response to the sliding operation of the user, a visual effect that each application icon on the home screen moves along or is compressed along a sliding direction during page turning may be simulated, so as to associate the sliding operation during page turning with a display manner of application icons on the home screen, and prompt the user with a specific direction of the page turning on the home screen.

In a possible implementation, the application icons of the N applications include icons in a first column and icons in a second column, and the icons in the first column are located on the right side of the icons in the second column. When the direction of the sliding operation is rightward, a distance of movement of a foreground-layer icon of the icon in the first column is greater than a distance of movement of a foreground-layer icon of the icon in the second column, or a distance of movement of a foreground-layer icon of the icon in the first column is greater than a distance of movement of a foreground-layer icon of the icon in the second column and a compression ratio of the foreground-layer icon of the icon in the first column is greater than a compression ratio of the foreground-layer icon of the icon in the second column. Alternatively, when the direction of the sliding operation is leftward, a distance of movement of a foreground-layer icon of the icon in the first column is less than a distance of movement of a foreground-layer icon of the icon in the second column, or a distance of movement a foreground-layer icon of the icon in the first column is less than a distance of movement of a foreground-layer icon of the icon in the second column and a compression ratio of the foreground-layer icon of the icon in the first column is less than a compression ratio of the foreground-layer icon of the icon in the second column. In other words, when an application icon on the home screen is closer to the sliding direction, the application icon is moved or compressed to a greater extent.

In a possible implementation, the electronic device may alternatively sequentially display columns of application icons on the home screen in the second display manner based on positions at which the application icons are moved on the home screen. For example, when the sliding direction is rightward, if it is detected that the icon in the first column is moved to a right edge of the home screen, the electronic device may display the icon in the first column in the second display manner. If it is detected that the icon in the second column is moved to the right edge of the home screen, the electronic device may display the icon in the second column in the second display manner.

In a possible implementation, when displaying the second screen page of the home screen, the electronic device may alternatively display one or more application icons on the second screen page in the second display manner.

In a possible implementation, after the receiving a start operation performed by a user on the first application icon on a first screen page, and before the application interface of the first application is displayed, the method further includes: reducing a size of the first application icon or deepening a color of the first application icon. In other words, when displaying the application icons around the first application icon in the first display manner in response to the start operation performed by the user on the first application icon, the electronic device may display the currently operated first application icon in a specific display manner.

According to a second aspect, this application provides a method for displaying an application icon, including: displaying an application interface of a first application; receiving a return operation (for example, tapping a return button in the application interface) performed by a user on the first application; and in response to the return operation, the electronic device may switch from displaying the application interface to displaying a part or all of a first screen page of a home screen. The first screen page includes a first application icon of the first application. In the switching process (or after the switching process), the electronic device may display a first layer of application icons around the first application icons on the first screen page in a first display manner. In this case, the first display manner means that the first layer of application icons move along a direction away from the first application icon.

In this way, when the user exits an application to return to the home screen, the electronic device may display a display effect that application icons around the corresponding application icon move away from the currently operated application icon, so as to prompt, through changes of the surrounding icons, the user to quickly find a specific position of the currently operated application icon on the home screen, thereby enhancing guidance for the user.

In a possible implementation, the first layer of application icons include a first foreground-layer icon and a first background-layer icon, and the first foreground-layer icon is located on the first background-layer icon. That the first layer of application icons move along a direction away from the first application icon specifically includes: the first foreground-layer icon moves relative to the first background-layer icon along the direction away from the first application icon. An implementation in which the first foreground-layer icon moves relative to the first background-layer icon along the direction away from the first application icon is the same as an implementation in which the first foreground-layer icon moves relative to the first background-layer icon along a direction approaching the first application icon during starting of the application in the first aspect.

In a possible implementation, when the first foreground-layer icon moves relative to the first background-layer icon along the direction away from the first application icon, the first foreground-layer icon may be further compressed.

In a possible implementation, when the first foreground-layer icon moves relative to the first background-layer icon along the direction away from the first application icon, the first background-layer icon may be further compressed.

In this way, when the first application is exited, a visual effect that the application icons around the first application icon all move away from the first application icon may be presented on the home screen, so as to simulate a display effect that the application icons around the first application icon are pushed away by the returned first application icon during returning from the first application icon.

In a possible implementation, the first screen page further includes a second layer of application icons, the second layer of application icons are adjacent to the first layer of application icons, the second layer of application icons include a second foreground-layer icon and a second background-layer icon, and the second foreground-layer icon is located on the second background-layer icon. The foregoing method further includes: moving the second foreground-layer icon relative to the second background-layer icon along a direction away from the first application icon, where a distance by which the second foreground-layer icon moves relative to the second background-layer icon along the direction away from the first application icon is less than a distance by which the first foreground-layer icon moves relative to the first background-layer icon along the direction away from the first application icon.

In a possible implementation, when the second foreground-layer icon is moved relative to the second background-layer icon along the direction away from the first application icon, the second foreground-layer icon may be further compressed, where a compression ratio of the second foreground-layer icon is less than a compression ratio of the first foreground-layer icon.

In other words, in a scenario of exiting an application, compression and movement effects to different extents may be presented for different application icons based on distances between the first application icon and the application icons around the first application icon.

In a possible implementation, after the first layer of application icons are displayed in the first display manner, the method further includes: resetting a position of the first foreground-layer icon, so that the first application icon is restored to a default position and size on the home screen.

According to a third aspect, this application provides a method for displaying an application icon, including: displaying a lock screen interface of a touchscreen; receiving a sliding operation performed by a user on the lock screen interface; and in response to the sliding operation, the electronic device switches from displaying the lock screen interface to displaying a part or all of a first screen page of a home screen. The first screen page includes application icons of N (N is an integer greater than 1) applications, each application icon includes a foreground-layer icon and a background-layer icon. In the switching process (or after the switching process), the electronic device may display the application icons of the N applications in a first display manner. The first display manner means that the foreground-layer icon moves relative to the background-layer icon along a direction of the sliding operation, or when the foreground-layer icon moves relative to the background-layer icon along the direction of the sliding operation, the foreground-layer icon is compressed. Certainly, when the foreground-layer icon moves relative to the background-layer icon along the direction of the sliding operation, the background-layer icon may also be compressed.

In this way, after the user unlocks the screen by using the sliding operation, a movement or compression visual effect of each application icon on the home screen may be associatively presented, and the sliding unlock operation entered by the user in the lock screen interface is associated with a display effect of the application icon on the home screen, so that the display effect of the application icon is more realistic.

Similar to the scenario of starting an application and the scenario of exiting an application, the electronic device may present compression and movement effects to different extents for different application icons based on sliding directions during the sliding for unlocking.

According to a fourth aspect, this application provides a method for displaying an application icon, including: receiving a fingerprint entered by a user on an unlock position of a touchscreen; and if verification of the fingerprint succeeds, displaying a first screen page of a home screen in a first display manner, where the first screen page includes application icons of N applications, and each application icon includes a foreground-layer icon and a background-layer icon. The first display manner means that the foreground-layer icon moves relative to the background-layer icon along a direction away from the unlock position, or when the foreground-layer icon moves relative to the background-layer icon along the direction away from the unlock position, the foreground-layer icon is compressed. Certainly, when the foreground-layer icon moves relative to the background-layer icon along the direction of the sliding operation, the background-layer icon may also be compressed.

Similar to the scenario of starting an application and the scenario of exiting an application, the electronic device may present compression and movement effects to different extents for different application icons based on distances between the application icons and the unlock position during fingerprint unlocking.

According to a fifth aspect, this application provides a method for displaying an application icon, including: displaying a first application icon and a second application icon on a home screen; and receiving a dragging operation of dragging the first application icon to the second application icon by a user; and in response to the dragging operation, in a process in which the second application icon is approaching the first application icon, a foreground-layer icon of the second application icon may be moved relative to a background-layer icon along a direction pointing to the first application icon; or in a process in which the second application icon is moving away from the first application icon, the foreground-layer icon of the second application icon may also be moved relative to the background-layer icon along the direction pointing to the first application icon.

In this way, in a process of dragging the first application icon by the user, an electronic device may present a visual effect that the second application icon is pulled toward the first application icon by the first application icon dragged by the user.

Similarly, during relative movement of the foreground-layer icon and the background-layer icon, the foreground-layer icon and/or the background-layer icon may be further compressed, so as to more accurately restore a visual effect of moving the second application icon toward the first application icon. This is not limited in embodiments of this application.

According to a sixth aspect, this application provides a method for displaying an application icon, including: displaying a first application icon on a home screen; receiving a deletion operation of deleting the first application icon by a user; and in response to the deletion operation, an electronic device may display a foreground-layer icon of the first application icon based on a first deletion effect, and may display a background-layer icon of the first application icon based on a second deletion effect.

For example, the first deletion effect may be: gradually shrinking the foreground-layer icon to 0 and rotating the foreground-layer icon by a first angle within a first preset time. The second deletion effect may be: gradually shrinking the background-layer icon to 0 and rotating the background-layer icon by a second angle within the second preset time. In this way, during deletion of the first application icon, a visual effect of separately deleting the foreground-layer icon and the background-layer icon of the first application icon may be presented.

In a possible implementation, a specific delay may be set between displaying the first deletion effect and displaying the second deletion effect by the electronic device. For example, when starting to display the foreground-layer icon of the first application icon based on the first deletion effect, the electronic device may start a preset timer, and when the timer expires, may start to display the background-layer icon of the first application icon based on the second deletion effect. In this way, during deletion of the first application icon, a visual effect of sequentially deleting the foreground-layer icon and the background-layer icon may be presented.

According to a seventh aspect, this application provides a method for displaying an application icon, including: displaying a first application icon of a first application on a home screen; and after receiving a new message from the first application, displaying a badge on the first application icon, where the badge is used to indicate a quantity of currently unread messages. In a process of displaying the badge (or after displaying the badge), the electronic device may display a foreground-layer icon of the first application icon based on a first new message effect, and may display a background-layer icon of the first application icon based on a second new message effect.

For example, the first new message effect may be: magnifying the foreground-layer icon based on a first magnification ratio and then restore the foreground-layer icon within a first preset time. The second new message effect may be: magnifying the background-layer icon based on a second magnification ratio and then restore the background-layer icon within a second preset time. In this way, when the first application receives a new message, during display of the first application icon of the first application, an effect of moving the foreground-layer icon and the background-layer icon in a staggered manner may be presented, so as to attract a user's attention and prompt the user to receive the new message.

In a possible implementation, a specific delay may be set between displaying the first new message effect and displaying the second new message effect by the electronic device. For example, when starting to display the foreground-layer icon of the first application icon based on the first new message effect, the electronic device may start a preset timer, and when the timer expires, may start to display the background-layer icon of the first application icon based on the second new message effect.

According to an eighth aspect, this application provides an electronic device, including a touchscreen, a fingerprint component, one or more processors, one or more memories, and one or more computer programs. The processor is coupled to the touchscreen, the fingerprint component, and the memory. The one or more computer programs are stored in the memory. When the electronic device runs, the processor executes the one or more computer programs stored in the memory, so that the electronic device performs the method for displaying an application icon according to any one of the foregoing aspects.

According to a ninth aspect, this application provides a computer readable storage medium, including computer instructions. When the computer instructions are run on an electronic device, the electronic device is enabled to perform the method for displaying an application icon according to any one of the foregoing aspects.

According to a tenth aspect, this application provides a computer program product. When the computer program product is run on an electronic device, the electronic device is enabled to perform the method for displaying an application icon according to any one of the foregoing aspects.

It may be understood that the electronic device in the eighth aspect, the computer readable storage medium in the ninth aspect, and the computer program product in the tenth aspect that are provided above are all configured to perform the corresponding methods provided above. Therefore, for beneficial effects that can be achieved by the electronic device, the computer storage medium, and the computer program product, refer to beneficial effects in the corresponding methods provided above. Details are not described herein again.

DESCRIPTION OF EMBODIMENTS

The following describes implementations of embodiments in detail with reference to the accompanying drawings.

The method for displaying an application icon provided in the embodiments of this application may be applied to an electronic device such as a mobile phone, a tablet computer, a notebook computer, an ultra-mobile personal computer (UMPC), a handheld computer, a netbook, a personal digital assistant (PDA), a wearable electronic device, a vehicle-mounted device, or a virtual reality device. This is not limited in this embodiment of this application.

Figure 1:
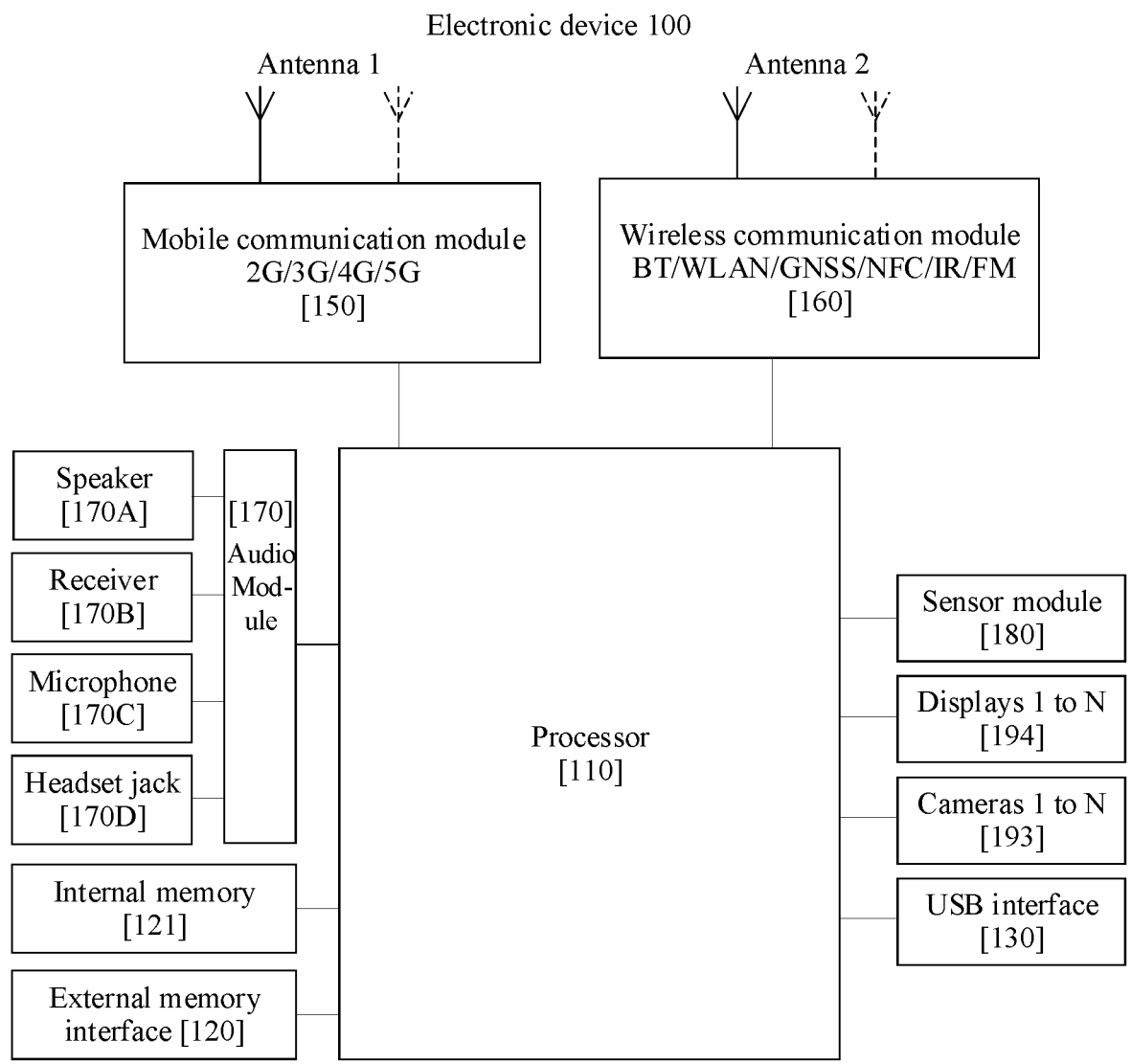
FIG. 1 is a schematic diagram 1 of a structure of an electronic device according to an embodiment of this application.

For example, FIG. 1 is a schematic diagram of a structure of an electronic device 100.

The electronic device 100 may include a processor 110, an external memory interface 120, an internal memory 121, a universal serial bus (USB) interface 130, an antenna 1, an antenna 2, a mobile communication module 150, a wireless communication module 160, an audio module 170, a speaker 170A, a receiver 170B, a microphone 170C, a headset interface 170D, a sensor module 180, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 can provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in the same device as at least some modules of the processor 110.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, a display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, a camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image is generated for an object through the lens, and is projected onto the photosensitive element. The light-sensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more types of video codecs. In this way, the electronic device 100 can play or record videos in a plurality of encoding formats, for example, moving picture experts group (MPEG)-1, MPEG-2, MPEG-3, and MPEG-4.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, or may include a nonvolatile memory, for example, at least one magnetic disk storage device, a flash memory, or a universal flash storage (UFS).

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (OMTP) standard interface or a Cellular Telecommunications Industry Association of the USA (CTIA) standard interface.

The sensor module 180 may include a touch sensor, a fingerprint component, a pressure sensor, a gyro sensor, a barometric pressure sensor, a magnetic sensor, an acceleration sensor, a distance sensor, a proximity light sensor, a fingerprint sensor, a temperature sensor, an ambient optical sensor, a bone conduction sensor, and the like.

The touch sensor is used as an example. The touch sensor may collect a touch event performed by a user on or near the touch sensor (for example, an operation performed by a user on a surface of the touch sensor by using any suitable object such as a finger or a stylus), and send collected touch information to another component such as the processor 110. For example, the touch sensor may be implemented in a plurality of manners, such as a resistive type, a capacitive type, an infrared type, and a surface acoustic wave type. The touch sensor and the display 194 may be integrated into a touchscreen of the electronic device 100, or the touch sensor and the display 194 may be used as two separate components to implement input and output functions of the electronic device 100.

Certainly, the electronic device 100 may further include a charging management module, a power management module, a battery, a button, an indicator, one or more SIM card interfaces, and the like. This is not limited in this embodiment of this application.

A layered architecture, an event-driven architecture, a micro-core architecture, a micro-service architecture, or a cloud architecture may be used for a software system of the electronic device 100. In embodiments of this application, an Android system of a layered architecture is used as an example to describe a software structure of the electronic device 100.

Figure 2:
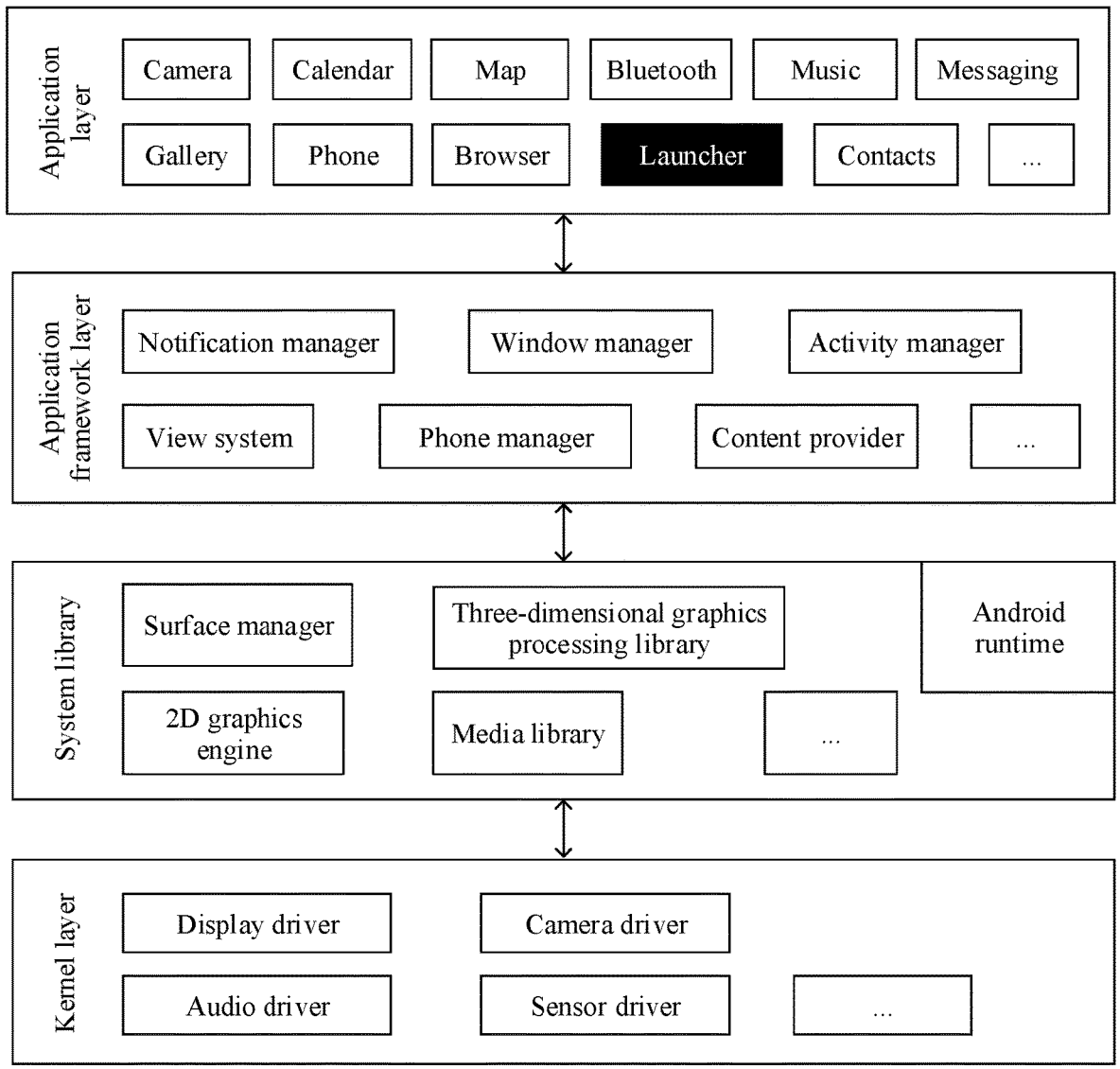
FIG. 2 is a diagram of an architecture of an operating system in an electronic device according to an embodiment of this application.

FIG. 2 is a block diagram of the software structure of the electronic device 100 in this embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

1. Application Layer

The application layer may include a series of applications.

As shown in FIG. 2, the applications may include applications (APPs) such as Phone, Contacts, Camera, Gallery, Calendar, Map, Navigation, Bluetooth, Music, Videos, and Messaging.

Still as shown in FIG. 2, the application layer further includes an Android core application such as a launcher (which may also be referred to as a home screen or a main screen). Generally, after the Android system starts, the launcher may be used as a core application to run permanently in the Android system.

Figure 3:
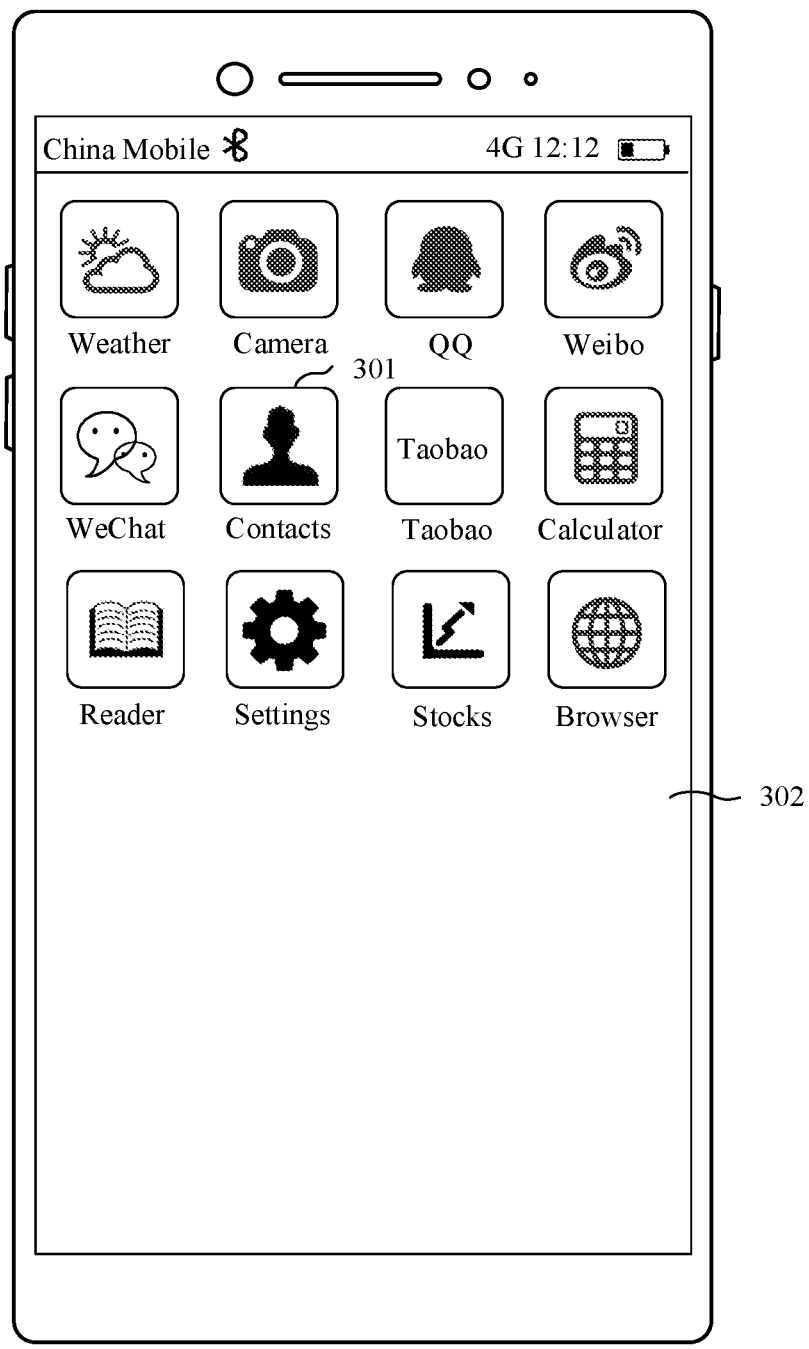
FIG. 3 is a schematic diagram 1 of an application scenario of a method for displaying an application icon according to an embodiment of this application.

The launcher may be configured to display and manage another app installed at the application layer. As shown in FIG. 3, an application icon 301 of an application is generally displayed in a launcher 302, and is centrally managed by the Launcher 302. If it is detected that a user performs an operation such as tapping, long-pressing, or dragging on the application icon 301 in the launcher 302, in response to the operation of the user, the launcher 302 may trigger a corresponding application to execute a corresponding operation instruction. For example, if it is detected that a user taps the application icon 301 of the Contacts app in the launcher 302, the launcher 302 may generate a startup message of the Contacts app, start an application process of the Contacts app by invoking a related service in the application framework layer, and finally display an interface of the Contacts app on the screen. The launcher 302 can include a plurality of screen pages, and FIG. 3 shows only one screen page.

Figure 4:
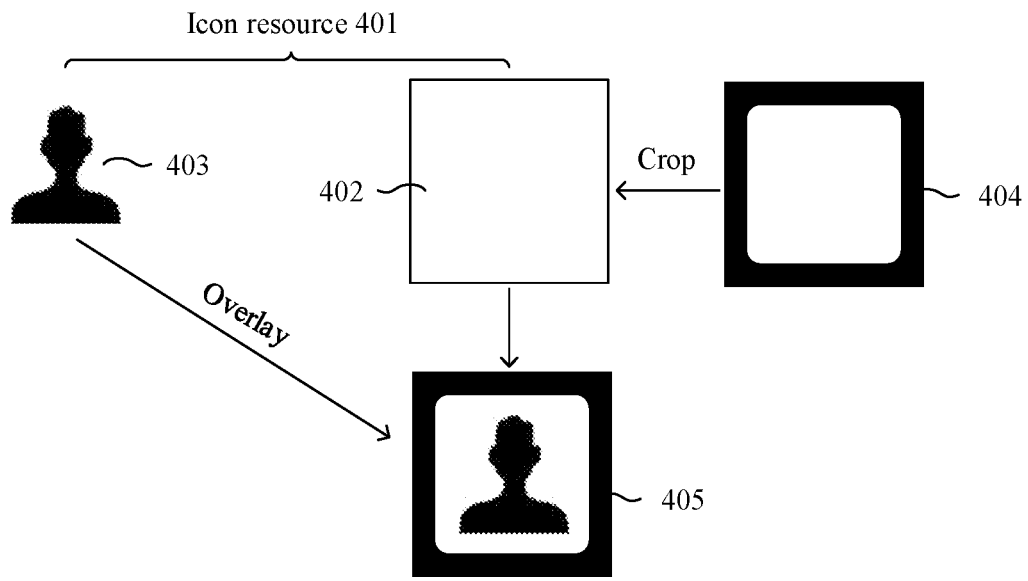
FIG. 4 is a schematic diagram of an application icon according to an embodiment of this application.

When displaying an application icon of each application, the launcher 302 may obtain an icon resource provided by the application. The Contacts app is used as an example. An installation package of the Contacts app may provide an icon resource of the contacts app. As shown in FIG. 4, an icon resource 401 of the Contacts app includes a background-layer icon 402 and a foreground-layer icon 403. The foreground-layer icon 403 is generally located on the background-layer icon 402, and a size of the foreground-layer icon 403 is generally less than a size of the background-layer icon 402. Each application vendor may add an icon resource of an application icon to an application installation package based on a size and format required by the Android system.

In this case, when the application icon of the Contacts app is displayed in the launcher 302, the launcher 302 may obtain the icon resource 401 (which is the background-layer icon 402 and the foreground-layer icon 403) of the Contacts app from the installation package of the Contacts app. Moreover, still as shown in FIG. 4, further, to keep sizes of application icons displayed in the launcher 302 the same, the launcher 302 may further use a preset mask 404 (which may be referred to as a contour) to crop the background-layer icon 402, so that the background-layer icon 402 has a same shape and size as the mask 404. Further, the launcher 302 may overlay the foreground-layer icon 403 on a cropped background-layer icon 402 to finally form an application icon 405 of the Contacts app. For each to-be-displayed application icon, the launcher 302 may use the mask 404 to create an application icon with a same shape and size according to the foregoing method. In this way, the launcher 302 may arrange these application icons with the same size and shape in the launcher 302, to improve appearance of the application icons in the launcher 302. In addition, an application icon displayed in the launcher 302 may alternatively include two layers, namely, a foreground layer and a background layer, and does not include a mask layer.

2. Application Framework Layer

The application framework layer provides an application programming interface (API) and a programming framework for an application at the application layer. The application framework layer includes some predefined functions.

For example, the application framework layer may include a notification manager, an activity manager, a window manager, a content provider, a view system, a phone manager, and the like.

The view system may be configured to construct a display interface of an application. Each display interface may include one or more controls. Generally, the control may include interface elements such as an icon, a button, a menu, a tab, a text box, a dialog box, a status bar, a navigation bar, and a widget.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may be a notification that appears in a status bar on top of the system in a form of a graph or a scroll bar text, for example, a notification of an application running on the background, or may be a notification that appears on the screen in a form of a dialog window. For example, text information is displayed in the status bar, an alert sound is played, the electronic device vibrates, or an indicator light blinks.

The activity manager may be configured to manage the life cycle of each application. The application usually runs in an operating system in a form of an activity. The activity manager may schedule an activity process of the application to manage the lifecycle of each application. The window manager is configured to manage a window program.

The window manager may obtain a size of the display, determine whether a status bar is available, lock the screen, capture the screen, and so on.

The content provider is configured to: store and obtain data, and make the data accessible to an application. The data may include a video, an image, audio, calls that are made and received, a browsing history and bookmarks, a phone book, and the like.

The phone manager is configured to provide a communication function of the mobile phone, for example, management of a call status (including answering, declining, or the like). The resource manager provides various resources for an application, such as a localized character string, an icon, a picture, a layout file, and a video file.

3. Android Runtime and System Library

The Android runtime includes a kernel library and a virtual machine. The Android runtime is responsible for scheduling and management of the Android system.

The kernel library includes two parts: one part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, such as a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports playback and recording in a plurality of frequently used audio and video formats, static image files, and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, compositing, layer processing, and the like. The 2D graphics engine is a drawing engine for 2D drawing.

4. Kernel Layer

The kernel layer is a layer between hardware and software. The kernel layer includes at least a display driver, a camera driver, an audio driver, a sensor driver, and the like. This is not limited in this embodiment of this application.

In embodiments of this application, each application icon displayed in the launcher 302 includes, for example, three layers. The three layers include the mask in the mask layer, the background-layer icon in the background layer, and the foreground-layer icon in the foreground layer. Generally, the mask in the mask layer is fixed. In this case, the launcher 302 may change at least one of the background layer or the foreground layer, to implement a staggered display effect during display of the application icon. For example, when displaying the application icon 405 of the Contacts app, the launcher 302 may add a display effect of swinging the foreground-layer icon 403 left and right on the background-layer icon 402 for 200 ms, so as to increase a spatial sense during display of the application icon 405.

In some embodiments, the application icon 405 of the Contacts app is still used as an example. When displaying the application icon 405, the launcher 302 may simulate, by moving the application icon 405, a display effect of moving or compressing the application icon 405, so as to present a visual effect that the application icon 405 is attracted or pushed away. In all embodiments of the present invention, a specific manner of "moving an application icon" may be: overall moving and/or relative moving. In the overall moving manner, the application icon may be moved and/or compressed as a whole. In this case, layers of the application icon are not relatively moved or compressed. In the relative moving manner, one or more layers of the application icon may be relatively moved and/or compressed (for example, only a foreground-layer icon of the application icon is moved and/or compressed, or only a background-layer icon of the application icon is moved and/or compressed). Some examples are given below for specific description.

Figures 5A, 5B:
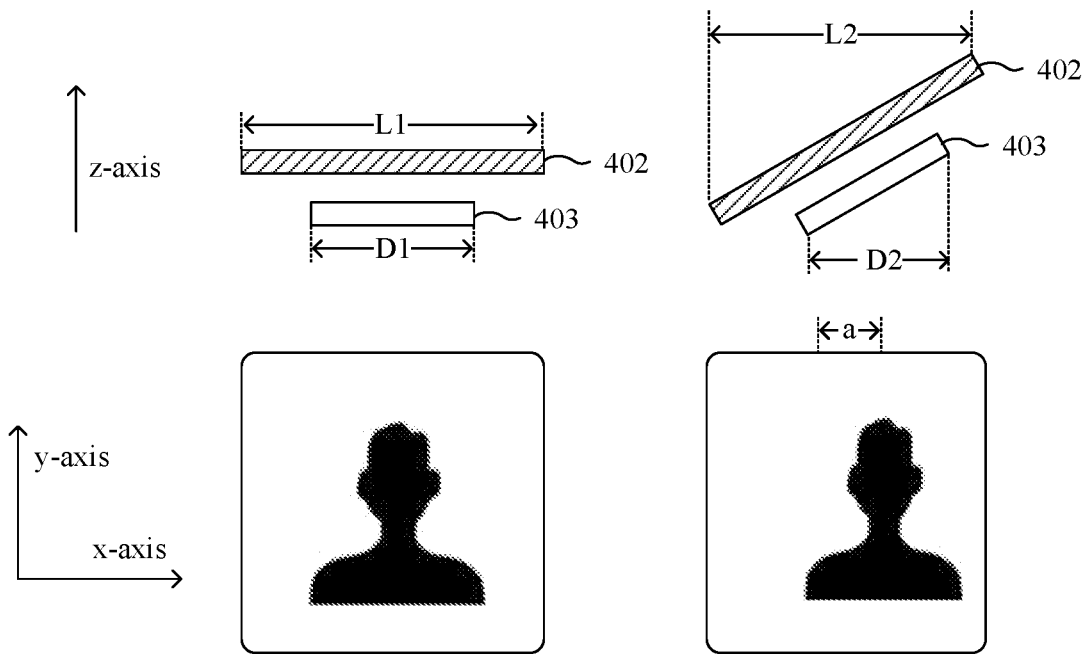
FIG. 5(a) and FIG. 5(b) are a schematic diagram of moving or compressing an application icon according to an embodiment of this application.

For example, a horizontal direction in which a user normally views the application icon 405 is an x-axis, a vertical direction is a y-axis, and a direction perpendicular to a plane in which the application icon 405 is located is a z-axis. When the application icon 405 does not move, as shown in FIG. 5(a), in the z-axis direction, the background-layer icon 402 is located on the mask 404 (the mask 404 is not shown), and the foreground-layer icon 403 is located on the background-layer icon 402. In this case, a projection of the foreground-layer icon 403 onto the x-axis is D1, and a projection of the background-layer icon 402 onto the x-axis is L1. When the application icon 405 rotates counterclockwise by a specific angle α around the y-axis, as shown in FIG. 5(b), a length of the projection of the foreground-layer icon 403 onto the x-axis is compressed from D1 to D2 (D2<D1), and a length of the projection of the background-layer icon 402 onto the x-axis is compressed from L1 to L2 (L2<L1). In addition, the foreground-layer icon 403 moves relative to the background-layer icon 402 by a distance a on the x-axis.

In this case, to simulate a display effect that the application icon 405 moves or is compressed counterclockwise around the y-axis, the launcher 302 may move the foreground-layer icon 403 relative to the background-layer icon 402 along a positive direction of the x-axis, so as to present a display effect of moving or compressing the application icon 405. For example, when the background-layer icon 402 is fixed, the launcher 302 may move the foreground-layer icon 403 along a positive direction of the x-axis. For another example, when the foreground-layer icon 403 is fixed, the launcher 302 may move the background-layer icon 402 along a negative direction of the x-axis. For still another example, the background-layer icon 402 and the foreground-layer icon 403 may move together along the positive direction of the x-axis, but with a moving speed of the foreground-layer icon 403 greater than a moving speed of the background-layer icon 402.

Further, to simulate a display effect that the application icon 405 moves or is compressed counterclockwise around the y-axis, the launcher 302 may further compress the foreground-layer icon 403 along the x-axis direction when moving the foreground-layer icon 403 relative to the background-layer icon 402 along the positive direction of the x-axis, so as to present a display effect of moving or compressing the application icon 405.

Certainly, when the foreground-layer icon 403 moves relative to the background-layer icon 402 along the positive direction of the x-axis, the launcher 302 may further compress the background-layer icon 402 along the x-axis direction, so as to present a display effect of moving or compressing the application icon 405. In this embodiment of this application, no limitation is imposed on a movement or compression manner of the foreground-layer icon and the background-layer icon of the application icon during simulation of the movement or compression of the application icon.

Figure 6:
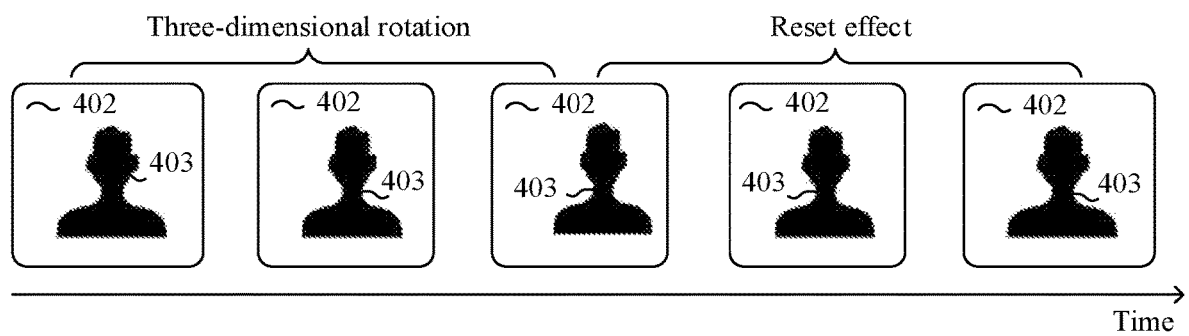
FIG. 6 is a schematic diagram 2 of an application scenario of a method for displaying an application icon according to an embodiment of this application.

For example, as shown in FIG. 6, when displaying the application icon 405 of the Contacts app, the launcher 302 may gradually compress the background-layer icon 402 and the foreground-layer icon 403 along the x-axis direction, and may gradually move the foreground-layer icon 403 along the positive direction of the x-axis at the same time. In this way, the launcher 302 may implement, through a change of a two-dimensional layer, a display effect of moving or compressing the application icon 405. Certainly, the launcher 302 may alternatively add a movement or compression display effect to the application icon 405 by executing a preset 3D rendering algorithm.

Subsequently, still as shown in FIG. 6, after displaying the current display effect of moving or compressing the application icon 405, the launcher 302 may play a reset effect of the application icon 405 based on a reverse operation of the current moving or compression, so that the moved or compressed application icon 405 is reset to the unmoved or compressed application icon 405.

The foregoing embodiment is described by using an example in which the application icon 405 moves or is compressed counterclockwise around the y-axis. It may be understood that the launcher 302 may alternatively simulate, according to a method similar to the foregoing method, a display effect that the application icon 405 moves or is compressed clockwise around the y-axis or counterclockwise around the x-axis or clockwise around the x-axis, so as to present a visual effect that the application icon 405 is pushed away or attracted to a specific direction. This is not limited in embodiments of this application.

In some embodiments, the application icon 405 is moved or compressed, and the launcher 302 may simulate an effect of three-dimensional rotation of the application icon 405. In this case, a shadow effect may be further added to the foreground-layer icon 403 of the application icon 405. For example, when the application icon 405 rotates in a three-dimension manner by a larger angle, that is, when the foreground-layer icon 403 moves on the background-layer icon 402 by a larger distance, the launcher 302 adds a higher blur degree and a larger projection distance of a shadow to the foreground-layer icon 403, so as to increase a stereoscopic effect during movement or compression of the application icon 405.

In this embodiment of this application, the launcher 302 can use the foregoing method to simulate a display effect of moving or compressing an application icon based on a foreground-layer icon and a background-layer icon of the application icon when displaying the application icon in different application scenarios (such as a page turning scenario, an unlocking scenario, and an application starting or closing scenario). This enhances a stereoscopic display effect of the application icon, and prompts a user to quickly find an operated application icon on the home screen, thereby enhancing guidance and an interest for the user.

It should be noted that an example in which an application icon includes a foreground-layer icon and a background-layer icon is used for description in subsequent embodiments. It may be understood that an icon resource provided by an application vendor in an application installation package may further include icons of more layers than a foreground layer and a background layer. When the launcher 302 adds a movement or compression display effect to an application icon that includes a plurality of layers, reference may be made to the related method provided in this embodiment.

In addition, during display of an application icon of an application by using another operating system different from the Android system, a mask may alternatively not be used to crop a plurality of layers of icons provided by an application vendor, but instead, the plurality of layers of icons in an obtained icon resource are directly overlaid in a specific order and then displayed in a display interface. This is not limited in this embodiment of this application.

A mobile phone is used below as an example of the electronic device 100, to describe in detail a method for displaying an application icon provided in this embodiment of this application with reference to the accompanying drawings.

In some embodiments, when a user starts an application in a launcher of the mobile phone, the mobile phone may display application icons in the launcher by using the foregoing movement or compression display effect. A movement or compression display effect is used for the application icon, so as to more directionally prompt the user with a specific position of the currently started application in the launcher.

Figure 7:
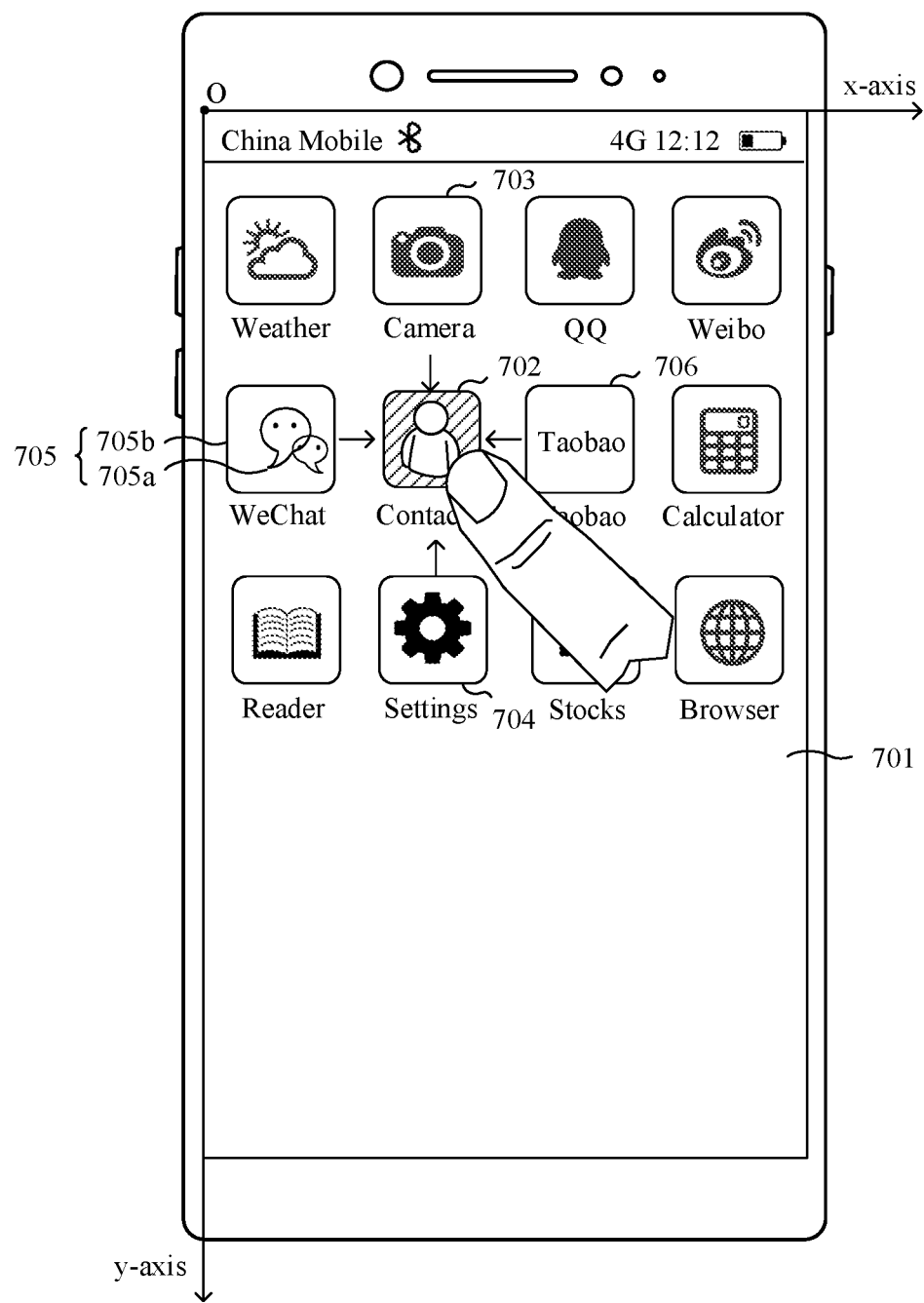
FIG. 7 is a schematic diagram 3 of an application scenario of a method for displaying an application icon according to an embodiment of this application.

For example, as shown in FIG. 7, a launcher 701 of the mobile phone includes 3*4 application icons. In addition, the user may also change a layout of application icons in the launcher 701, for example, change an icon layout in four columns to an icon layout in five columns. For example, an x-axis of a Cartesian coordinate system is parallel to a shorter edge of the launcher 701, and a y-axis of the Cartesian coordinate system is parallel to a longer edge of the launcher 701. The mobile phone may obtain a specific position of each application icon in the launcher 701. For example, an application icon 702 of the Contacts app is located in the second row and the second column of the launcher 701. In this case, when it is detected that the user taps the application icon 702 of the Contacts app, it indicates that the user needs to start the Contacts app. Certainly, the user may alternatively start, by using a floating gesture or a voice instruction, the Contacts app corresponding to the application icon 702 in the launcher 701.

In this case, when detecting that the user enters a start operation (for example, tapping the application icon 702) on the application icon 702, the mobile phone may display the tapped application icon 702 (namely, the operated icon) in a preset display manner, and at the same time, the mobile phone may display application icons around the application icon 702 in a first display manner. The first display manner means that one or more application icons around the operated icon (for example, the application icon 702) move along a direction pointing to the application icon 702.

For the currently tapped application icon 702, still as shown in FIG. 7, the mobile phone may display the application icon 702 in the preset display manner such as scaling, or modifying transparency or a color of the application icon 702. For example, the mobile phone may reduce a size of the application icon 702 to 90%, and deepen the color of the application icon 702, so as to prompt the user that the application icon 702 in the launcher 701 is selected. However, when the user taps the application icon 702, a finger of the user obstructs the application icon 702. Therefore, adding only the preset display manner to the application icon 702 by the mobile phone cannot well generate a prompt effect for the user.

Therefore, in this embodiment of this application, when displaying the application icon 702 in the preset display manner, the mobile phone may further associatively display application icons around the application icon 702 in the first display manner, so as to simulate a visual effect that the application icons around the application icon 702 are attracted by the application icon 702, and prompt the user that the currently operated application icon is the application icon 702.

The application icons around the application icon 702 may include a first layer of application icons adjacent to the application icon 702. For example, as shown in FIG. 7, the first layer of application icons may include application icons that are adjacent to the application icon 702 respectively in the positive direction of the x-axis, the negative direction of the x-axis, the positive direction of the y-axis, and the negative direction of the y-axis, namely, four application icons located above, below, on the left, and on the right of the application icon 702. To be specific, the first layer of application icons of the application icon 702 are respectively an application icon 703 of the Camera app, an application icon 704 of the Settings app, an application icon 705 of the WeChat app, and an application icon 706 of the Taobao app.

Figure 8:
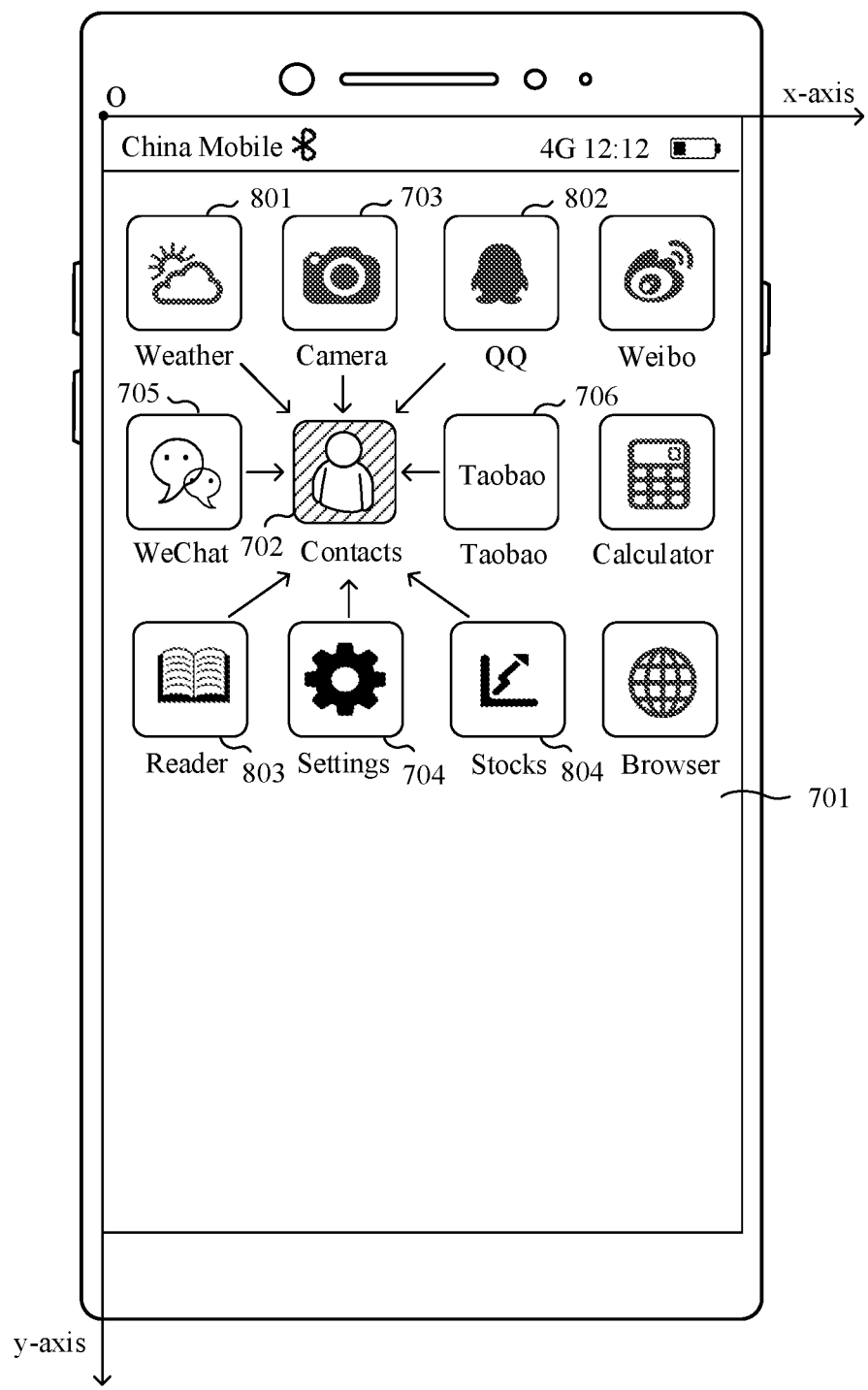
FIG. 8 is a schematic diagram 4 of an application scenario of a method for displaying an application icon according to an embodiment of this application.

Alternatively, as shown in FIG. 8, the first layer of application icons around the application icon 702 further include four application icons located in an upper-left corner, a lower-left corner, an upper-right corner, and a lower-right corner of the application icon 702, in addition to including the four application icons located above, below, on the left, and on the right of the application icon 702. In this case, the first layer of application icons around the application icon 702 may further include an application icon 801, an application icon 802, an application icon 803, and an application icon 804. These application icons are all located around the application icon 702 and adjacent to the application icon 702.

When detecting that the user taps the application icon 702, the mobile phone may display the first layer of application icons around the application icon 702 in the first display manner, so that each application icon in the first layer of application icons may approach the application icon 702. Still as shown in FIG. 7, the application icon 705 located on the left of the application icon 702 is used as an example. The application icon 705 includes a foreground-layer icon 705a and a background-layer icon 705b. When detecting that the user taps the application icon 702, the mobile phone may move the foreground-layer icon 705a relative to the background-layer icon 705b along a direction (which is the positive direction of the x-axis) pointing to the application icon 702, so as to present a display effect that the application icon 705 approaches the application icon 702, or a display effect that the application icon 705 is attracted by the application icon 702.

Optionally, when the foreground-layer icon 705a moves relative to the background-layer icon 705b toward the application icon 702, the mobile phone may further compress the foreground-layer icon 705a and/or the background-layer icon 705b. This is not limited in this embodiment of this application.

For example, the mobile phone may set display duration of the first display manner to 200 ms. After detecting that the user taps the application icon 702, the mobile phone may display the application icons around the application icon 702 in the first display manner within 200 ms. For example, within the 200 ms, the mobile phone may gradually move the foreground-layer icon 705a by a distance a along the positive direction of the x-axis, so as to present a display effect that the application icon 705 moves toward or is compressed toward the application icon 702. Alternatively, when moving the foreground-layer icon 705a along the positive direction of the x-axis, the mobile phone may further gradually compress the foreground-layer icon 705a by 20% along the positive direction of the x-axis. Alternatively, the mobile phone may further gradually compress the background-layer icon 705b of the application icon 705 by 20% along the same direction (which is the positive direction of the x-axis), so that a display effect that the application icon 705 approaches the application icon 702 is more realistic.

In addition, when moving the foreground-layer icon 705a, the mobile phone may further add a shadow effect to the foreground-layer icon 705a, so that a display effect that the application icon 705 approaches the application icon 702 is more realistic.

Similarly, for other application icons (such as the application icon 703, the application icon 704, and the application icon 706) in the first layer of application icons around the application icon 702, still as shown in FIG. 7, the mobile phone may display the corresponding application icons in the first display manner after detecting that the user taps the application icon 702, so as to simulate a display effect that each application icon in the first layer of application icons around the application icon 702 approaches the application icon 702.

In this way, when the user taps the application icon 702, a visual effect that the application icons around the application icon 702 all approach the application icon 702 is presented in the launcher 701. Therefore, the launcher 701 is simulated as an elastic net, in which when the user taps the application icon 702 in the launcher 701, the icons around the application icon 702 are pulled by elastic force to approach and be attracted to the application icon 702, so as to guide and prompt the user that the tap operation is currently performed on the application icon 702.

In some other embodiments, as still shown in FIG. 8, the first layer of application icons around the application icon 702 may further include the application icon 801, the application icon 802, the application icon 803, and the application icon 804, in addition to including the application icon 703, the application icon 704, the application icon 705, and the application icon 706.

In this case, similar to displaying the application icon 705 by the mobile phone in the first display manner, after detecting that the user taps the application icon 702 in the launcher 701, the mobile phone may also display the application icon 801, the application icon 802, the application icon 803, and the application icon 804 in the first display manner, so as to present a visual effect that the first layer of application icons around the application icon 702 all approach the application icon 702.

For example, as shown in FIG. 8, when displaying the application icon 801 in the first display manner, the mobile phone may make the foreground-layer icon and the background-layer icon of the application icon 801 move relative to each other along a direction (namely, a direction obtained by rotating the positive direction of the x-axis counterclockwise by 45°) in which the application icon 801 points to the application icon 702.

Figure 9A:
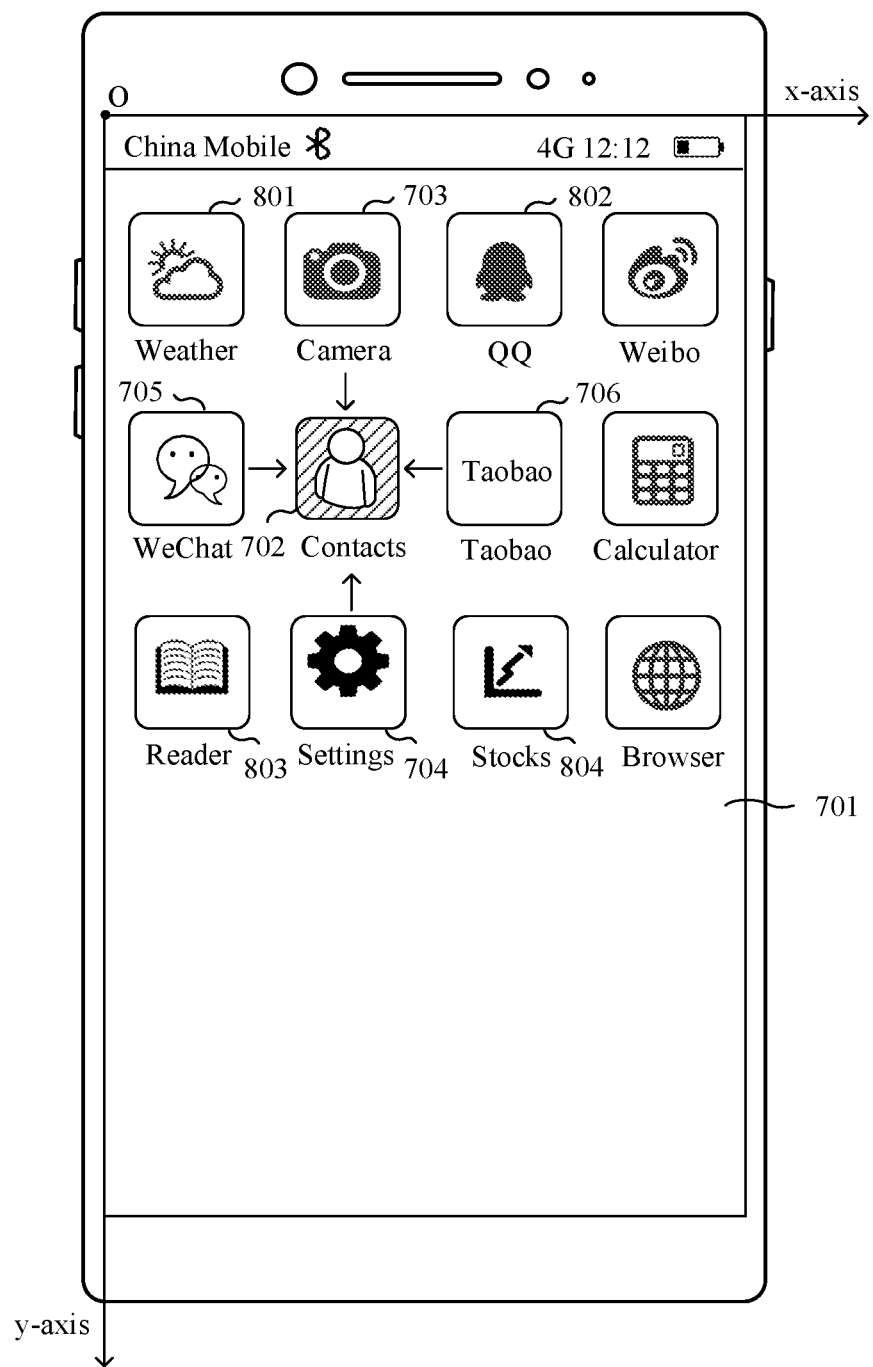
FIG. 9(a) and FIG. 9(b) are a schematic diagram 5 of an application scenario of a method for displaying an application icon according to an embodiment of this application.

Alternatively, as shown in FIG. 9(a), when the mobile phone displays the application icon 801 in the first display manner, because the application icon 801 is located above the application icon 702 in the y-axis direction, the mobile phone may use the positive direction of they axis as the direction in which the application icon 801 points to the application icon 702. Further, the mobile phone may make the foreground-layer icon and the background-layer icon of the application icon 801 move relative to each other along the positive direction of they axis. Similarly, the mobile phone may also determine, based on position relationships between the application icon 702 and the application icon 802, the application icon 803, and the application icon 804 in the y-axis direction, the positive direction of the y-axis (or the negative direction of the y-axis) as the direction pointing to the application icon 702. Further, the foreground-layer icon and the background-layer icon of the application icon are displayed in the first display manner, so as to implement a visual effect of, for example, approaching the application icon 702.

Figure 9B:
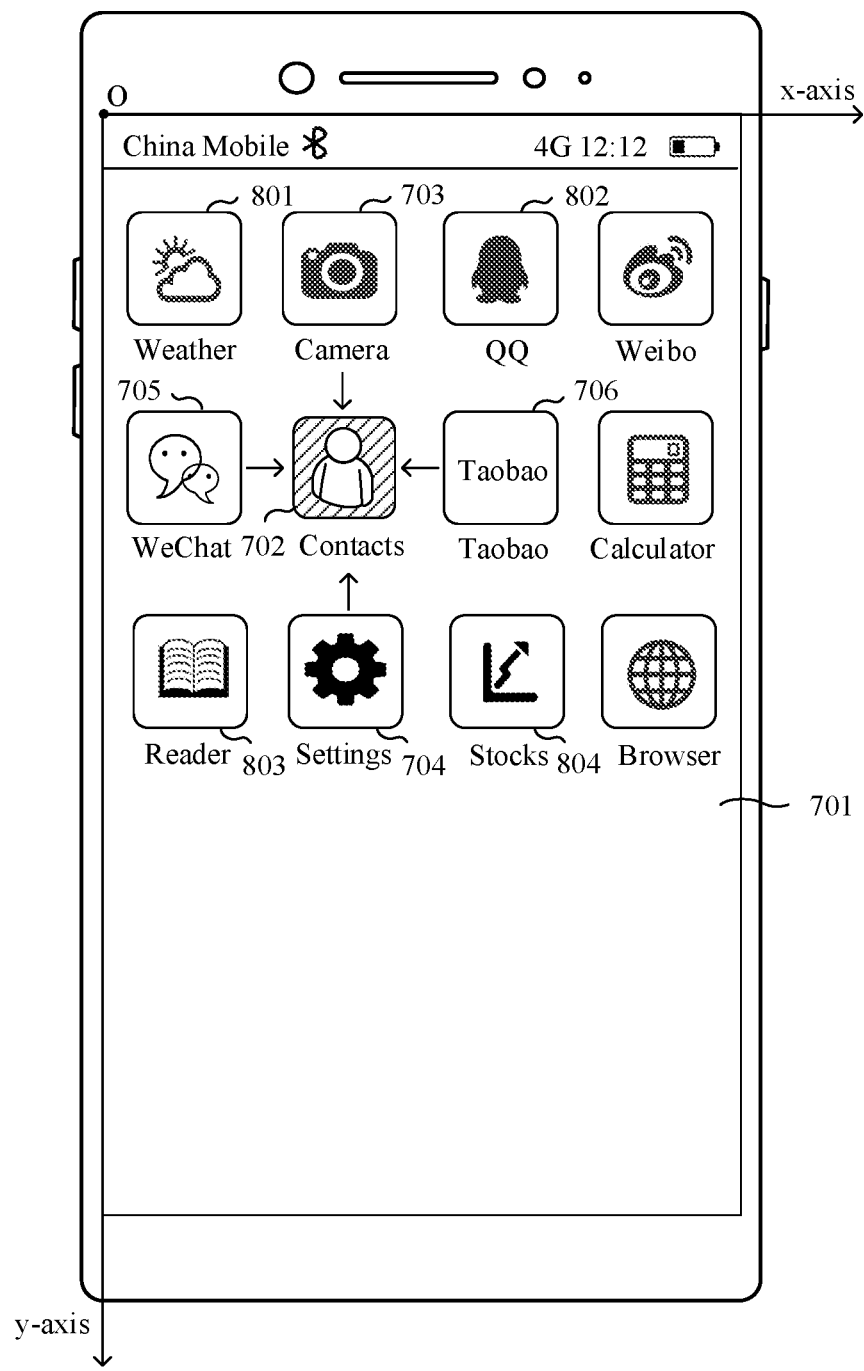

Alternatively, as shown in FIG. 9(b), when the mobile phone displays the application icon 801 in the first display manner, because the application icon 801 is located on the left of the application icon 702 in the x-axis direction, the mobile phone may use the positive direction of the x-axis as the direction in which the application icon 801 points to the application icon 702. Further, the mobile phone may make the foreground-layer icon and the background-layer icon of the application icon 801 move relative to each other along the positive direction of the x-axis. Similarly, the mobile phone may also determine, based on position relationships between the application icon 702 and the application icon 802, the application icon 803, and the application icon 804 in the x-axis direction, the positive direction of the x-axis (or the negative direction of the x-axis) as the direction pointing to the application icon 702. Further, the foreground-layer icon and the background-layer icon of the application icon are displayed in the first display manner, so as to implement a visual effect of, for example, approaching the application icon 702.

In some other embodiments, when the user taps the application icon 702 in the launcher 701, the mobile phone may further display application icons such as a second layer of application icons or a third layer of application icons around the application icon 702 in the first display manner, in addition to displaying the first layer of application icons around the application icon 702 in the first display manner.

Figure 10:
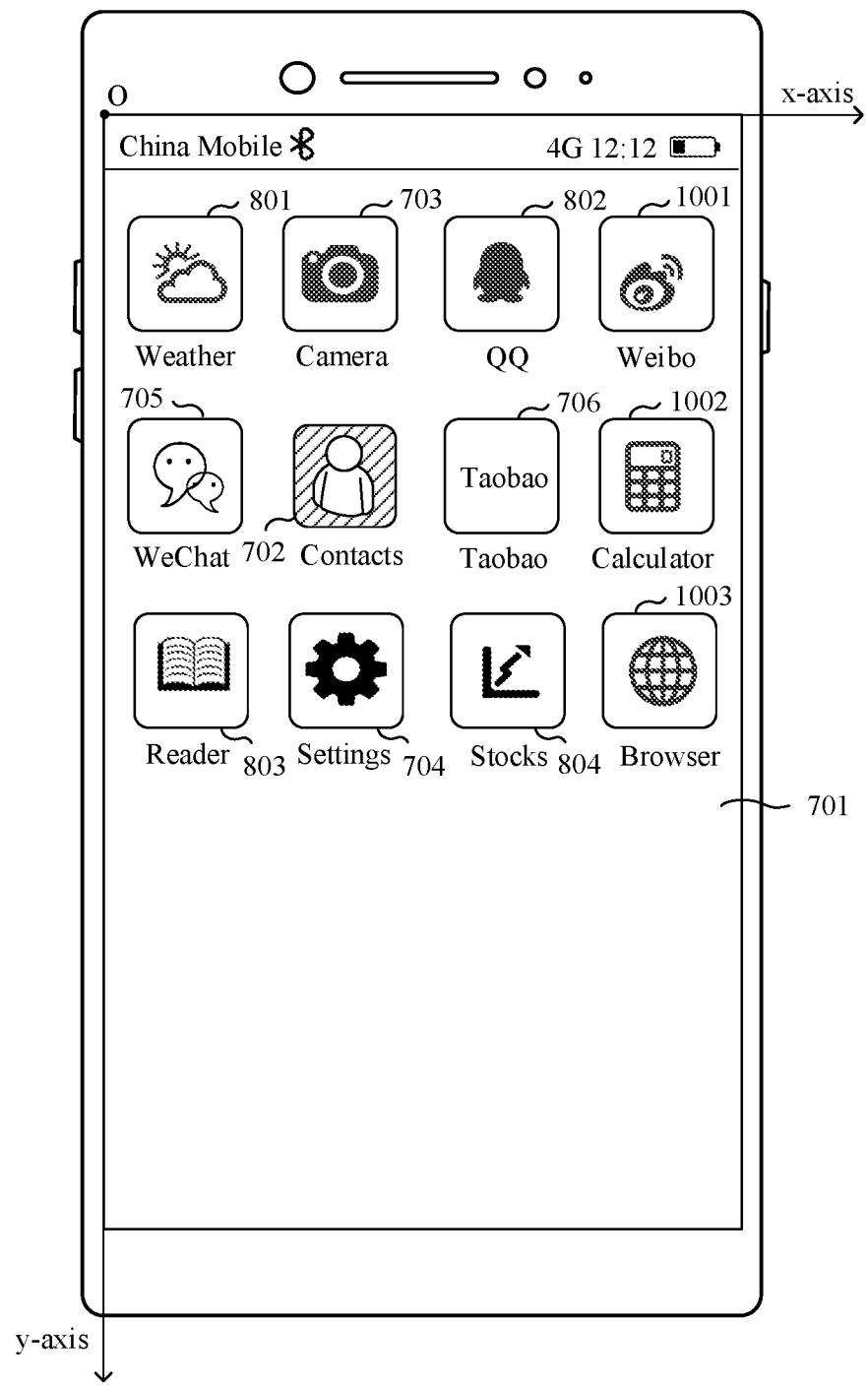
FIG. 10 is a schematic diagram 6 of an application scenario of a method for displaying an application icon according to an embodiment of this application.

For example, the second layer of application icons around the application icon 702 mean one or more application icons adjacent to the first layer of application icons around the application icon 702. As shown in FIG. 10, the second layer of application icons around the application icon 702 include an application icon 1001, an application icon 1002, and an application icon 1003. Similarly, the third layer of application icons around the application icon 702 mean one or more application icons (not shown in FIG. 10) adjacent to the second layer of application icons around the application icon 702.

Therefore, when the user taps the application icon 702 in the launcher 701, the mobile phone may further display the application icon 1001, the application icon 1002, and the application icon 1003 in the first display manner. The application icon 1002 is used as an example. The mobile phone may move a foreground-layer icon of the application icon 1002 relative to a background-layer icon along the direction pointing to the application icon 702, or when the foreground-layer icon of the application icon 1002 moves relative to the background-layer icon, the mobile phone may compress the foreground-layer icon of the application icon 1002, so as to present a visual effect that the application icon 1002 approaches the application icon 702.

Further, when displaying application icons around an operated icon (for example, the application icon 702) in the first display manner, the mobile phone may present compression and movement effects to different extents for different application icons based on values of distances between the application icon 702 and the application icons around the application icons 702, so as to achieve movement or compression effects to different extents. Generally, an icon closer to the operated icon is compressed to a greater extent and moved by a larger distance in the first display manner.

For example, because the second layer of application icons around the application icon 702 have a larger distance to the application icon 702 than the first layer of application icons of the application icon 702, a distance by which the second layer of application icons around the application icon 702 move toward the application icon 702 in the first display manner may be set to be less than a distance by which the first layer of application icons around the application icon 702 move toward the application icon 702 in the first display manner. For example, when displaying the application icon 705 (which is one of the first layer of application icons around the application icon 702), the mobile phone compresses the foreground-layer icon of the application icon 705 by 20%, and moves the foreground-layer icon of the application icon 705 relative to the background-layer icon by a distance a. In this case, during display of the display application icon 1002 (which is one of the second layer of application icons around the application icon 702), the foreground-layer icon of the application icon 1002 may be compressed by 10%, and the foreground-layer icon of the application icon 1002 may be moved relative to the background-layer icon by a/2. Therefore, an extent to which the application icon 1002 approaches the application icon 702 is less than an extent to which the application icon 705 approaches the application icon 702, so as to more realistically present a visual effect that surrounding icons are pulled from near to far when the user taps the application icon 702.

Certainly, when the user taps the application icon 702 in the launcher 701, the mobile phone may further display, in the first display manner, surrounding application icons such as the third layer of application icons and a fourth layer of application icons around the application icon 702 in the first display manner with a movement or compression effect. This is not limited in this embodiment of this application.

In some other embodiments, in the first display manner, the mobile phone may further simulate a display effect of approaching the operated icon by using an application icon as a unit to move the application icons around the operated icon, in addition to simulating a display effect of approaching the operated icon by changing foreground-layer icons and background-layer icons of the application icons around the operated icon.

Figure 11A:
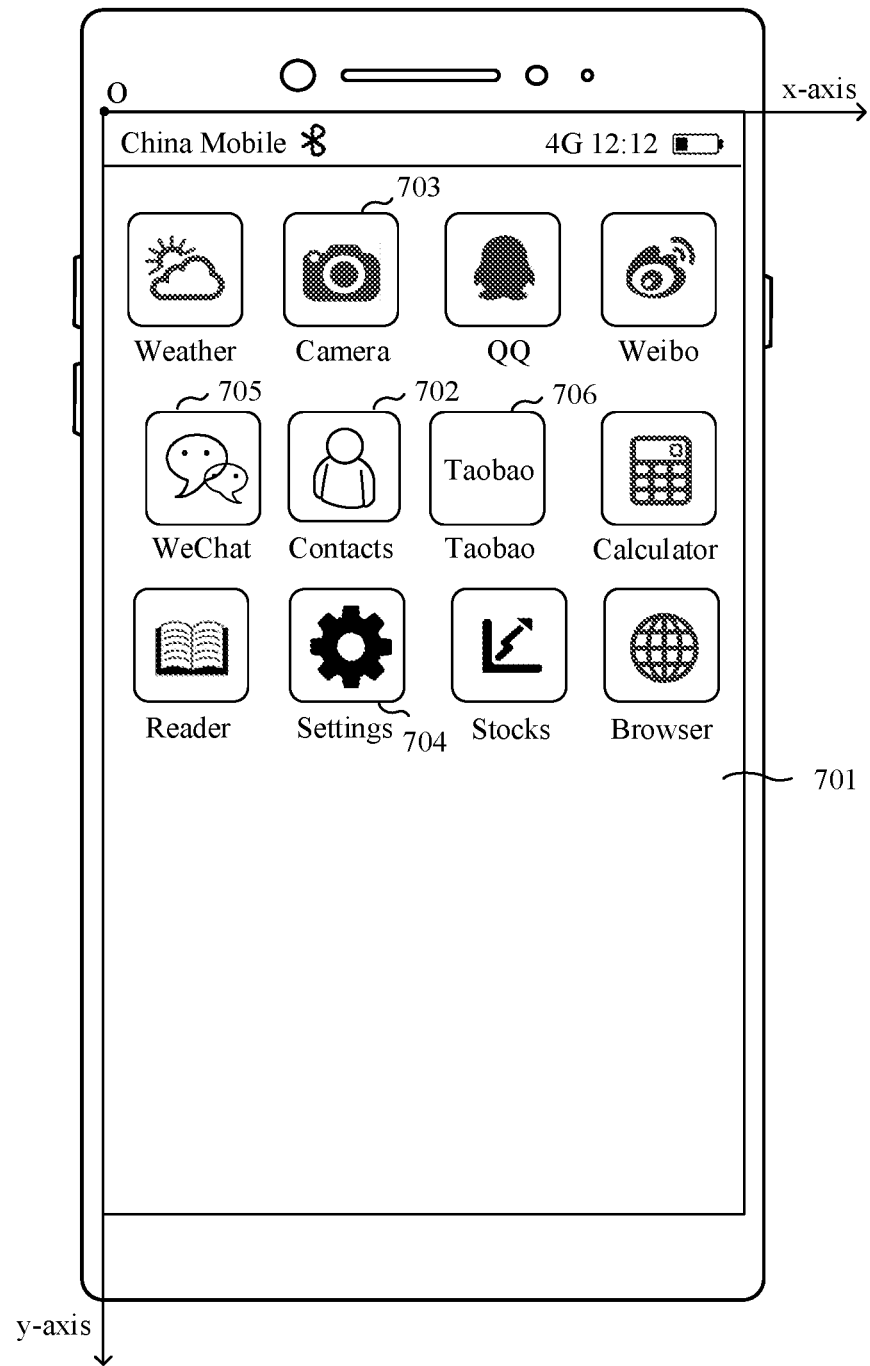
FIG. 11A is a schematic diagram 7 of an application scenario of a method for displaying an application icon according to an embodiment of this application.

For example, as shown in FIG. 11A, when the user taps the application icon 702 (namely, the operated icon) in the launcher 701, the mobile phone may move the first layer of application icons (for example, the application icon 703, the application icon 704, the application icon 705, and the application icon 706) around the application icon 702 along the direction pointing to the application icon 702. Certainly, the mobile phone may also move the second layer of application icons around the application icon 702 along the direction pointing to the application icon 702, so as to present a display effect that the application icons around the application icon 702 approach the application icon 702, and prompt the user to quickly find that the currently operated application icon is the application icon 702. The application icon 705 is used as an example. The mobile phone may move the application icon 705 along the positive direction of the x-axis. In this case, the foreground-layer icon and the background-layer icon of the application icon 705 do not move relative to each other, but instead, the entire application icon 705 approaches the operated application icon 702.

It should be noted that, in this embodiment of this application, a quantity of the application icons around the operated icon (for example, the application icon 702) is not limited. For example, as still shown in FIG. 10, when the user taps the application icon 1003 in the launcher 701, because the application icon 1003 is located in a lower-right corner of the launcher 701, a first layer of application icons located around the application icon 1003 include only three application icons: the application icon 1002, the application icon 706, and the application icon 804.

Figure 11B:
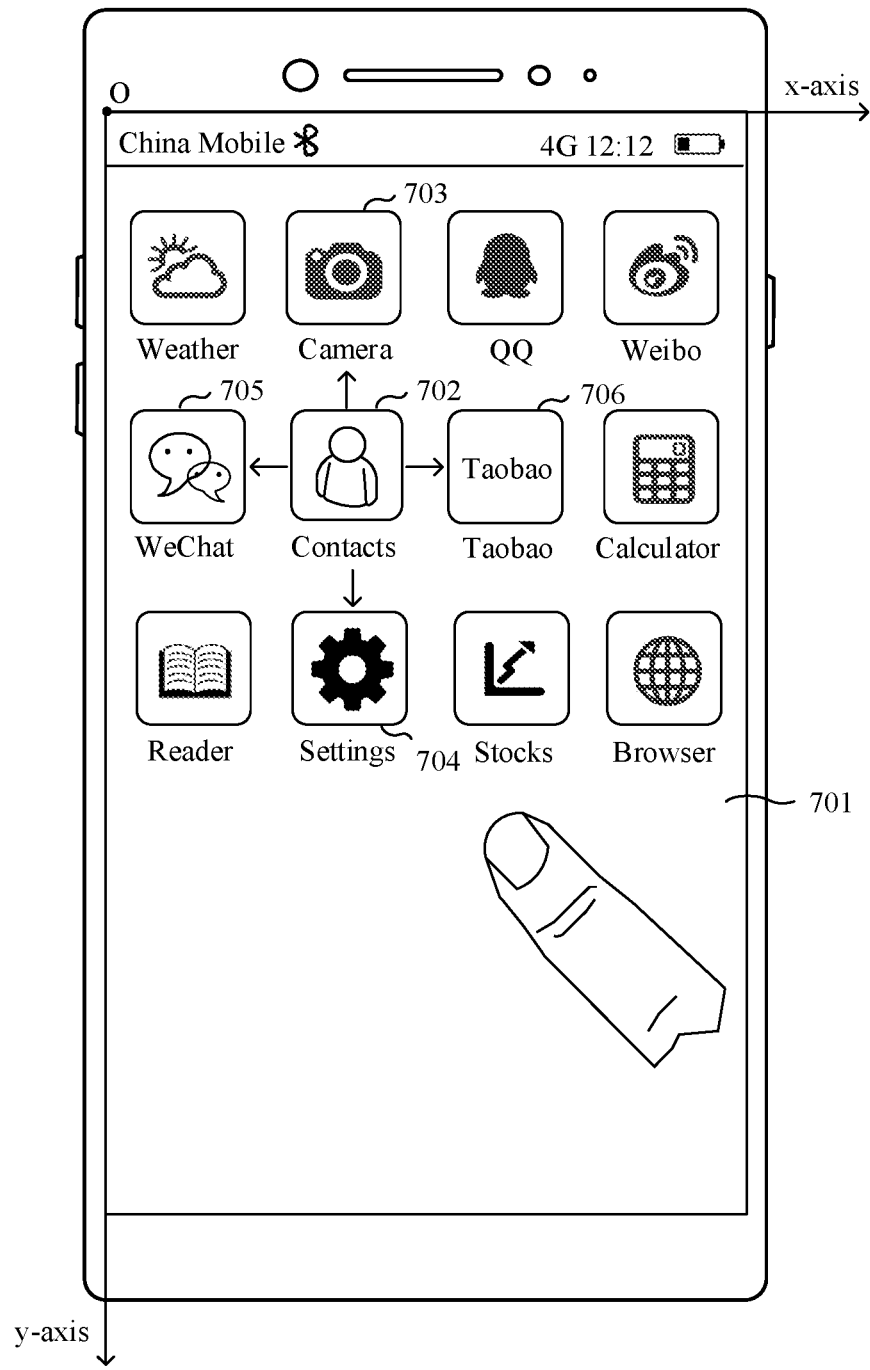
FIG. 11B is a schematic diagram 8 of an application scenario of a method for displaying an application icon according to an embodiment of this application.

In addition, if the mobile phone detects that a finger of the user leaves the application icon 702 during the display in the first display manner, or when the first display manner ends, as shown in FIG. 11B, the mobile phone may display, for the application icons around the application icon 702, a reset effect corresponding to the first display manner. The application icon 705 is still used as an example. After detecting that a finger of the user leaves the application icon 702, the mobile phone may reset the foreground-layer icon of the application icon 705 along a direction (which is the negative direction of the x-axis) in which the application icon 705 moves away from the application icon 702, so that the application icon 705 is restored to a default position and size in the launcher 701 (namely, a position and size before the user taps the application icon 702).

It can be learned that when the user operates (for example, taps) an application icon in the launcher of the mobile phone, the mobile phone may display the application icons around the operated icon in the first display manner, so as to present a visual effect that the surrounding application icons approach or are stretched toward the operated application icon, and prompt the user with an application icon taped in the current launcher.

In some embodiments, when the mobile phone returns to the launcher from a display interface of an application, the mobile phone displays an application icon of the application in the launcher. In this case, the mobile phone may perform scaling processing on the application icon of the application. Further, the mobile phone may also display application icons around the application icon by using the foregoing movement or compression display effect, so as to more directionally prompt the user with a specific position of the currently exited application icon in the launcher.

Figure 12A:
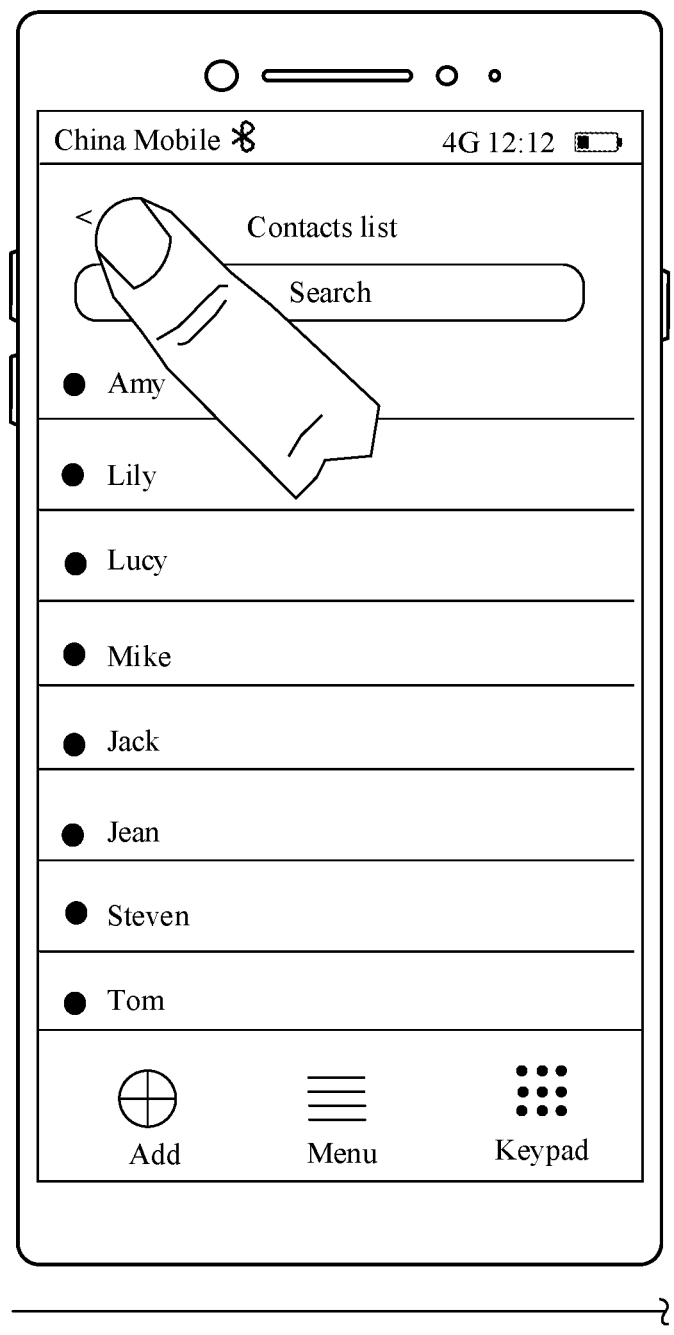
FIG. 12A(a) to FIG. 12A(c) are a schematic diagram 9 of an application scenario of a method for displaying an application icon according to an embodiment of this application.
Figure 12A:
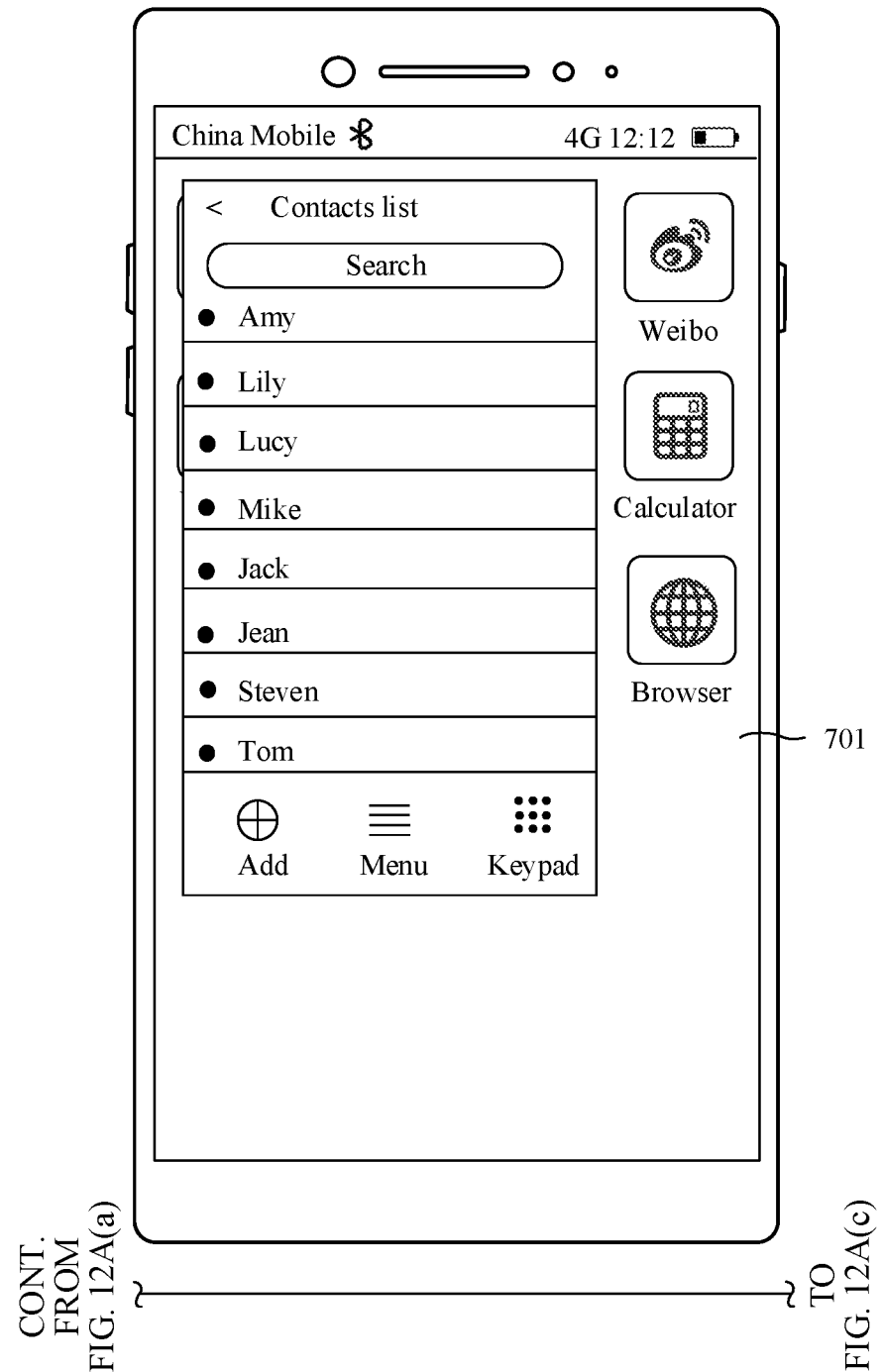
Figure 12A:
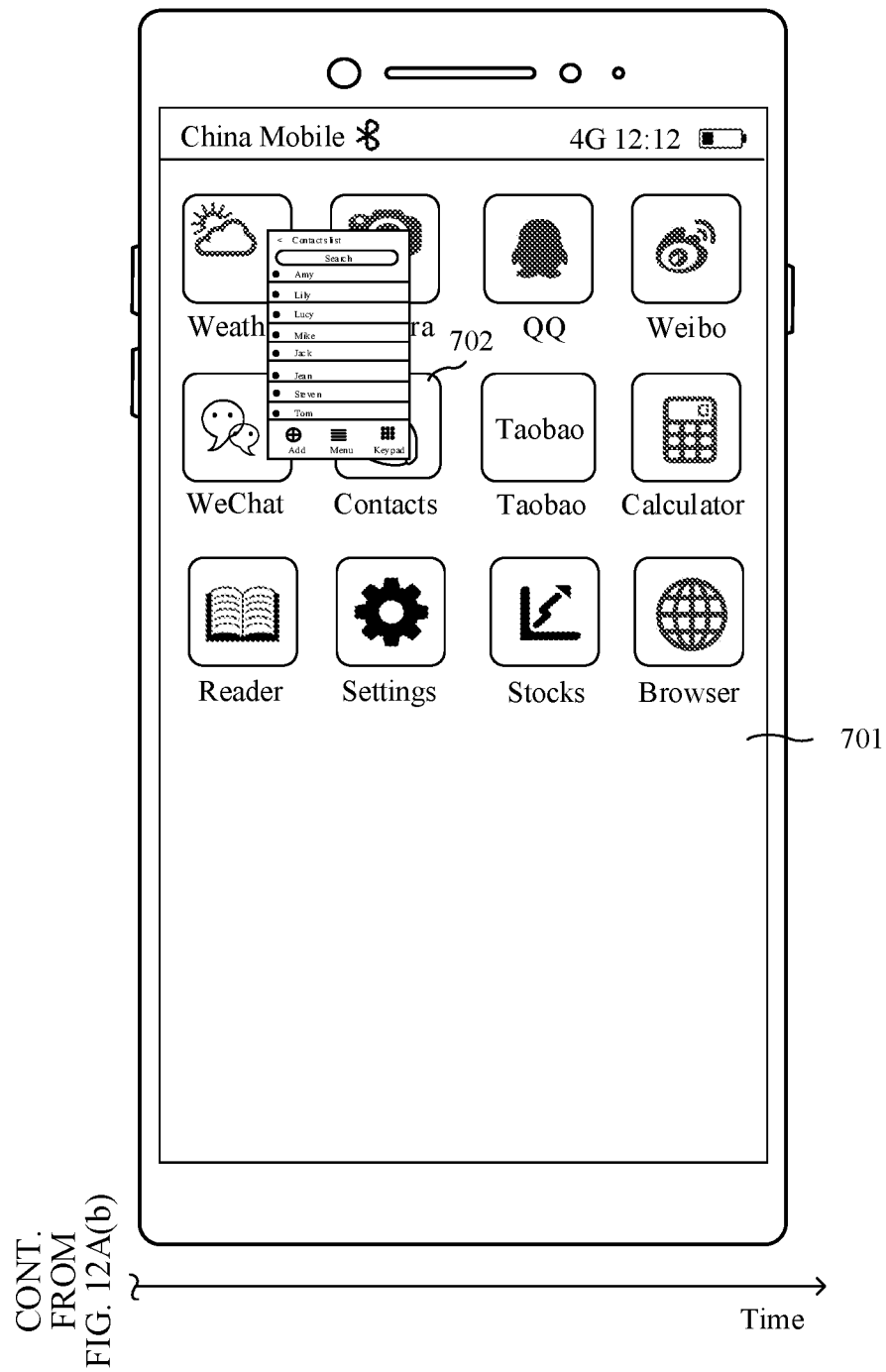

For example, as shown in FIG. 12A(a) to FIG. 12A(c), when the Contacts app in the mobile phone returns to the launcher 701, the mobile phone may switch from an application interface of the Contacts app to the launcher 701, and the launcher 701 includes an application icon of the Contacts app. For example, after detecting that the user taps a back button in the application interface of the Contacts app, the mobile phone may gradually shrink the application interface of the Contacts app, and at the same time, gradually display the launcher 701, to finally shrink the application interface of the Contacts app to a position (which is the second row and the second column in the launcher 701) of the corresponding application icon 702 in the launcher 701 and then make the application interface disappear.

In this embodiment of this application, in a process of switching from the application interface of the Contacts app to the launcher 701, or after the launcher 701 is displayed, the mobile phone may further display the application icons around the application icon 702 of the Contacts app in a second display manner. The second display manner means that one or more application icons around the operated icon (for example, the application icon 702) move along a direction away from the application icon 702, so as to simulate a visual effect that the application icons around the application icon 702 are pushed away by the application icon 702, and prompt the user that the currently operated application icon is the application icon 702.

A manner of dividing the application icons around the operated icon (which is the application icon 702) for the second display manner may be the same as a manner of dividing the application icons around the operated icon in for first display manner in the foregoing embodiment. Therefore, details are not described herein again.

Figure 12B:
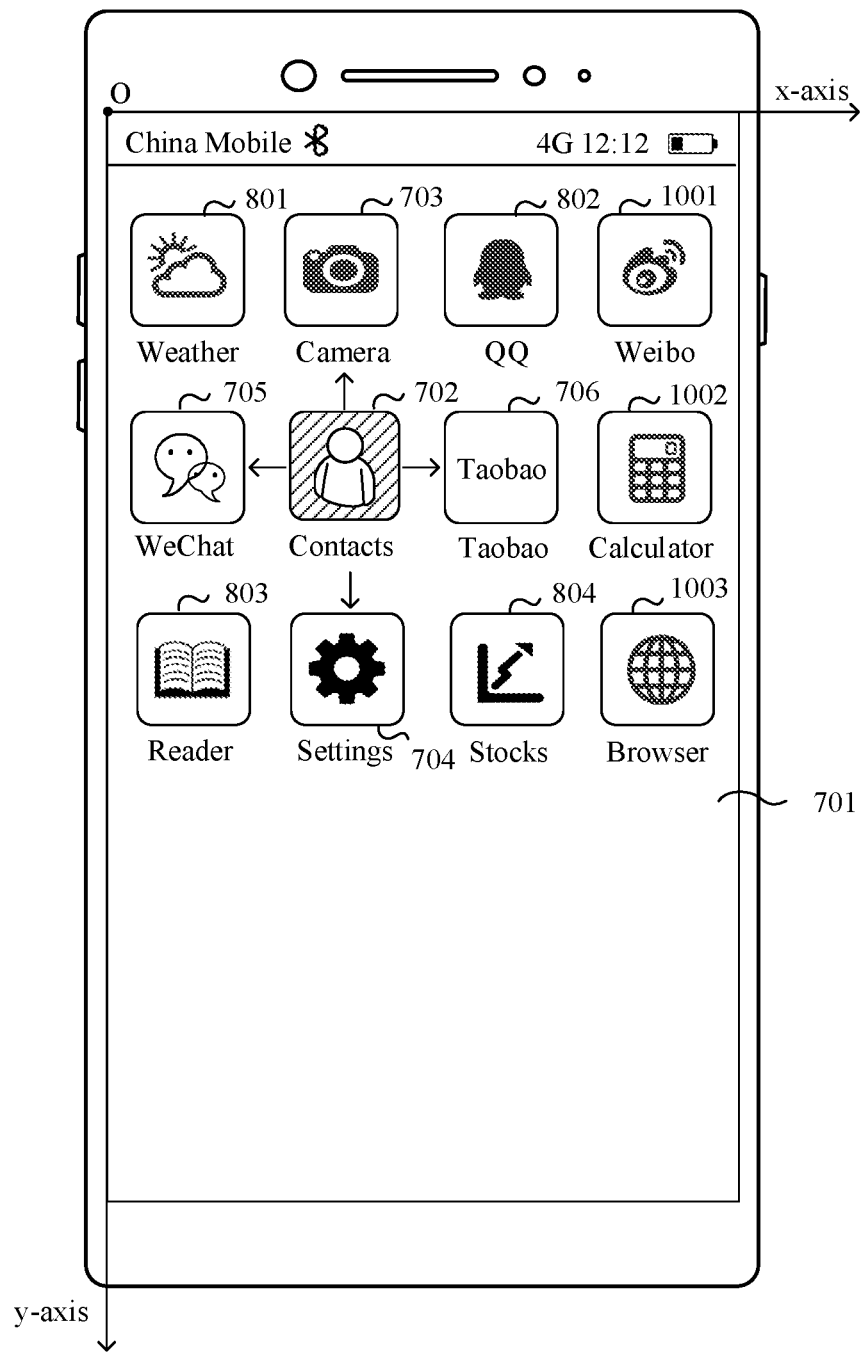
FIG. 12B is a schematic diagram 10 of an application scenario of a method for displaying an application icon according to an embodiment of this application.

For example, as shown in FIG. 12B, the first layer of application icons around the application icon 702 may include the application icon 703, the application icon 704, the application icon 705, and the application icon 706. Alternatively, the first layer of application icons may further include the application icon 801, the application icon 802, the application icon 803, and the application icon 804. Alternatively, the second layer of application icons around the application icon 702 may include the application icon 1001, the application icon 1002, and the application icon 1003, which are the second layer of application icons around the application icon 702.

In a process of returning from the application icon 702 to the launcher 701, the mobile phone may display, in the second display manner, the first layer of application icons around the application icon 702, so that each application icon in the first layer of application icons moves away from the application icon 702. The application icon 705 is still used as an example. During returning from the application icon 702 to the launcher 701, the mobile phone may move the foreground-layer icon of the application icon 705 relative to the background-layer icon along a direction (which is the negative direction of the x-axis) in which the application icon 705 moves away from the application icon 702, so as to present a display effect of returning from the application icon 705 to the application icon 702 in the launcher 701.

Optionally, when the foreground-layer icon of the application icon 705 moves relative to the background-layer icon along the negative direction of the x-axis, the mobile phone may further compress the foreground-layer icon and/or the background-layer icon of the application icon 705. This is not limited in this embodiment of this application.

Similarly, the mobile phone may display each application icon around the application icon 702 in the second display manner, so as to present a visual effect that the application icons around the application icon 702 all move away from the application icon 702 in the launcher 701, and simulate a display effect that the application icons around the application icon 702 are pushed by the returned application icon 702 during returning from the application icon 702 to the launcher 701.

Similar to the first display manner, when displaying application icons around an operated icon (for example, the application icon 702) in the second display manner, the mobile phone may present compression and movement effects to different extents for different application icons based on values of distances between the application icon 702 and the application icons around the application icons 702, so as to achieve movement or compression effects to different extents. Generally, an icon closer to the operated icon is compressed to a greater extent and moved by a larger distance in the second display manner.

For example, the mobile phone may set a distance by which the second layer of application icons around the application icon 702 move away from the application icon 702 in the second display manner to be less than a distance by which the first layer of application icons around the application icon 702 move away from the application icon 702 in the second display manner. Therefore, a visual effect that the surrounding icons are pushed from near to far during returning from the application icon 702 is more realistically presented.

Figure 13:
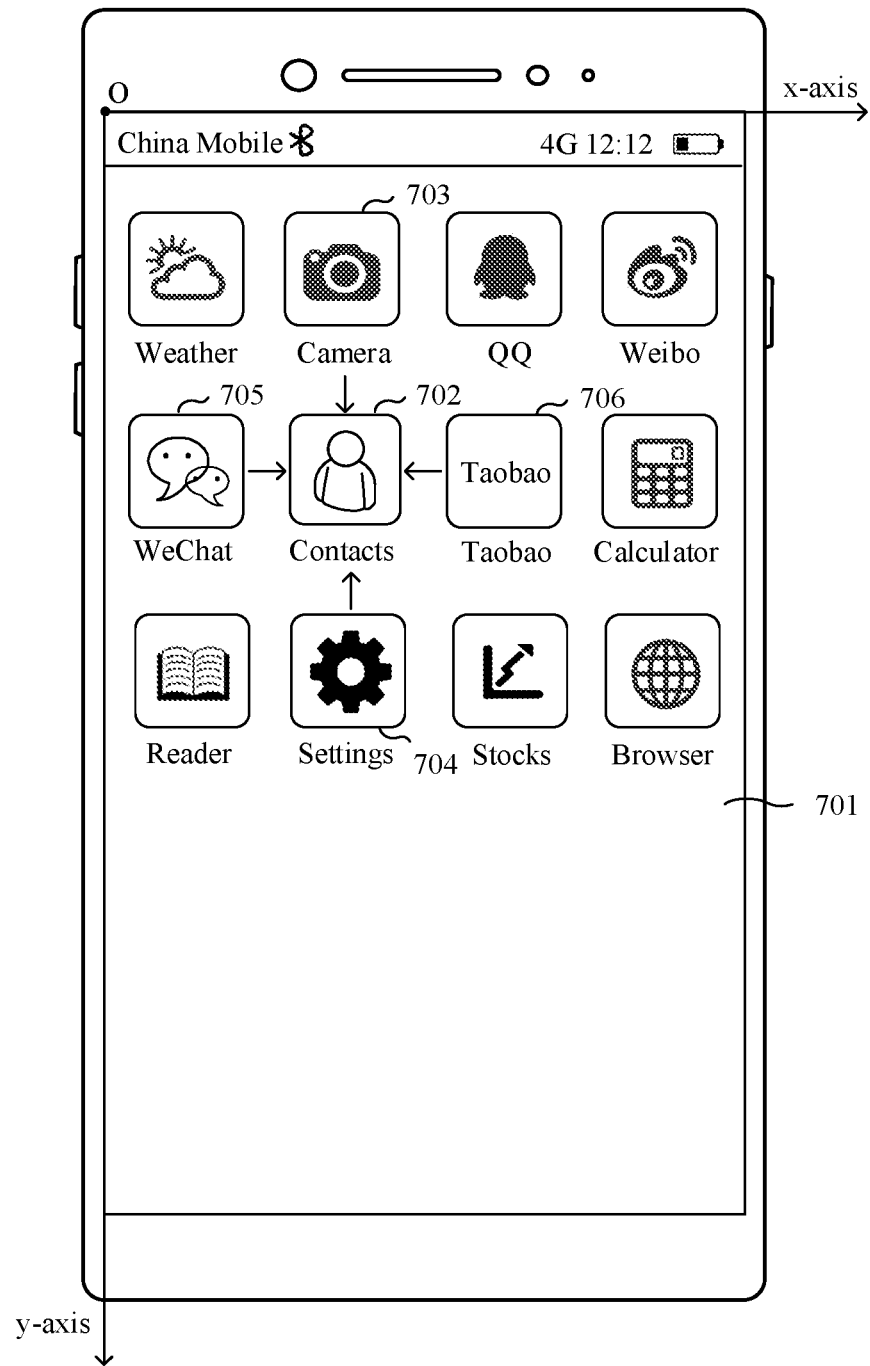
FIG. 13 is a schematic diagram 11 of an application scenario of a method for displaying an application icon according to an embodiment of this application.

In addition, after displaying the application icons around the application icon 702 in the second display manner, the mobile phone may automatically display a reset effect corresponding to the second display manner. As shown in FIG. 13, the application icon 705 is still used as an example. After displaying, in the second display manner, a display effect that the application icon 705 is pushed away by the application icon 702, the mobile phone may automatically reset the foreground-layer icon of the application icon 705 along the direction (which is the positive direction of the x-axis) pointing to the application icon 702, so that the application icon 705 is restored to a default position and size in the launcher 701. In this way, during returning from the application icon 702 to the launcher 701, the application icons around the application icon 702 may present a visual effect of first being pushed away by the application icon 702 and then restored to the original position, so as to prompt the user to quickly find that the currently operated application icon is the application icon 702 in the launcher 701.

In some other embodiments, similar to the first display manner shown in FIG. 11A in the foregoing embodiment, in the second display manner, the mobile phone may further simulate a display effect of approaching the operated icon by using an application icon as a unit to move the application icons around the operated icon, in addition to simulating a display effect of moving away from the operated icon by changing foreground-layer icons and background-layer icons of the application icons around the operated icon. In this case, the foreground-layer icon and the background-layer icon of the application icon do not move relative to each other.

In some embodiments, after the user unlocks the mobile phone, the mobile phone may also display each application icon in the launcher. In this case, the mobile phone may also display application icons in the launcher by using the foregoing movement or compression display effect, and associate a display effect of each application icon in the launcher with an unlock operation entered by the user.

Figure 14A:
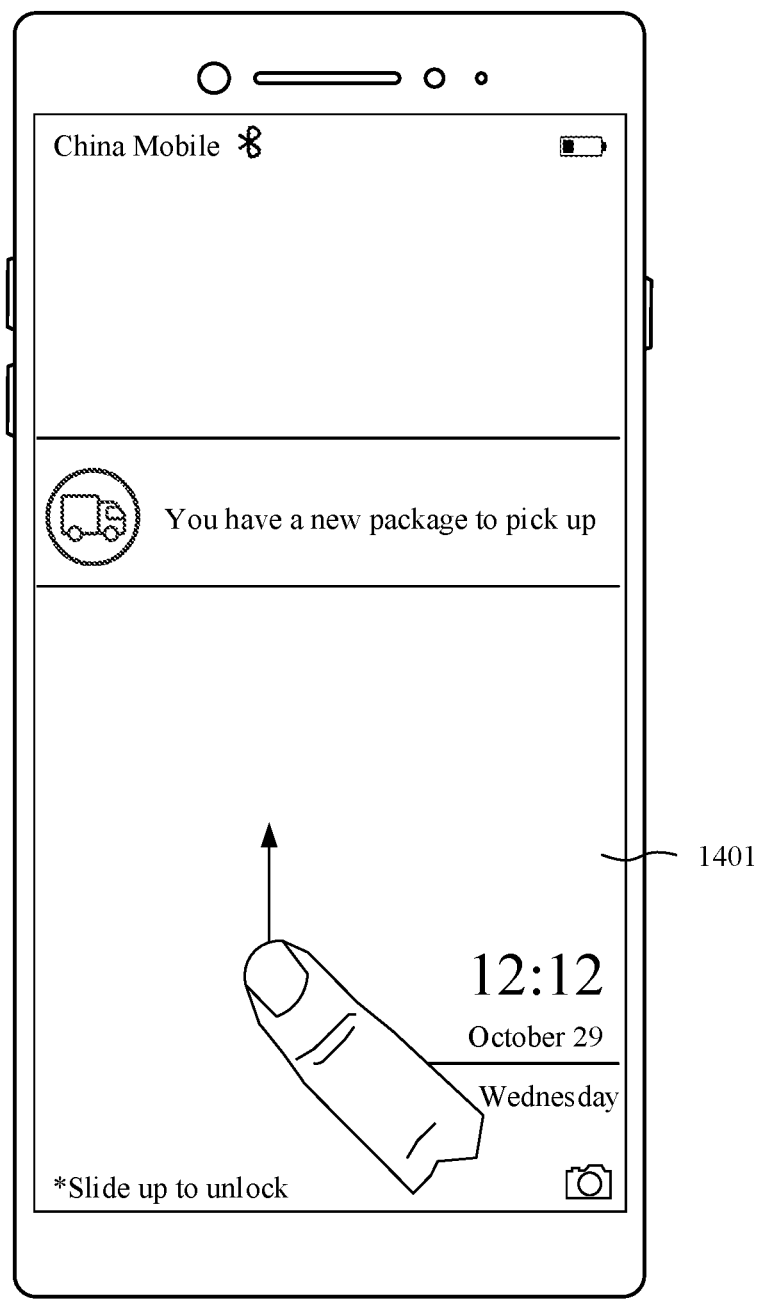
FIG. 14(a) and FIG. 14(b) are a schematic diagram 12 of an application scenario of a method for displaying an application icon according to an embodiment of this application.

In some implementations, the user may enter a preset sliding operation in a lock screen interface to unlock a screen of the mobile phone, so as to enter the launcher of the mobile phone. As shown in FIG. 14(*a*), the mobile phone may unlock the screen of the mobile phone in response to a slide-up operation entered by the user in a lock screen interface 1401, that is, the current unlocking operation is the slide-up operation. After unlocking the screen of the mobile phone, the mobile phone may switch from displaying the lock screen interface 1401 to displaying the launcher 701 and the application icons in the launcher 701.

Figure 14B:
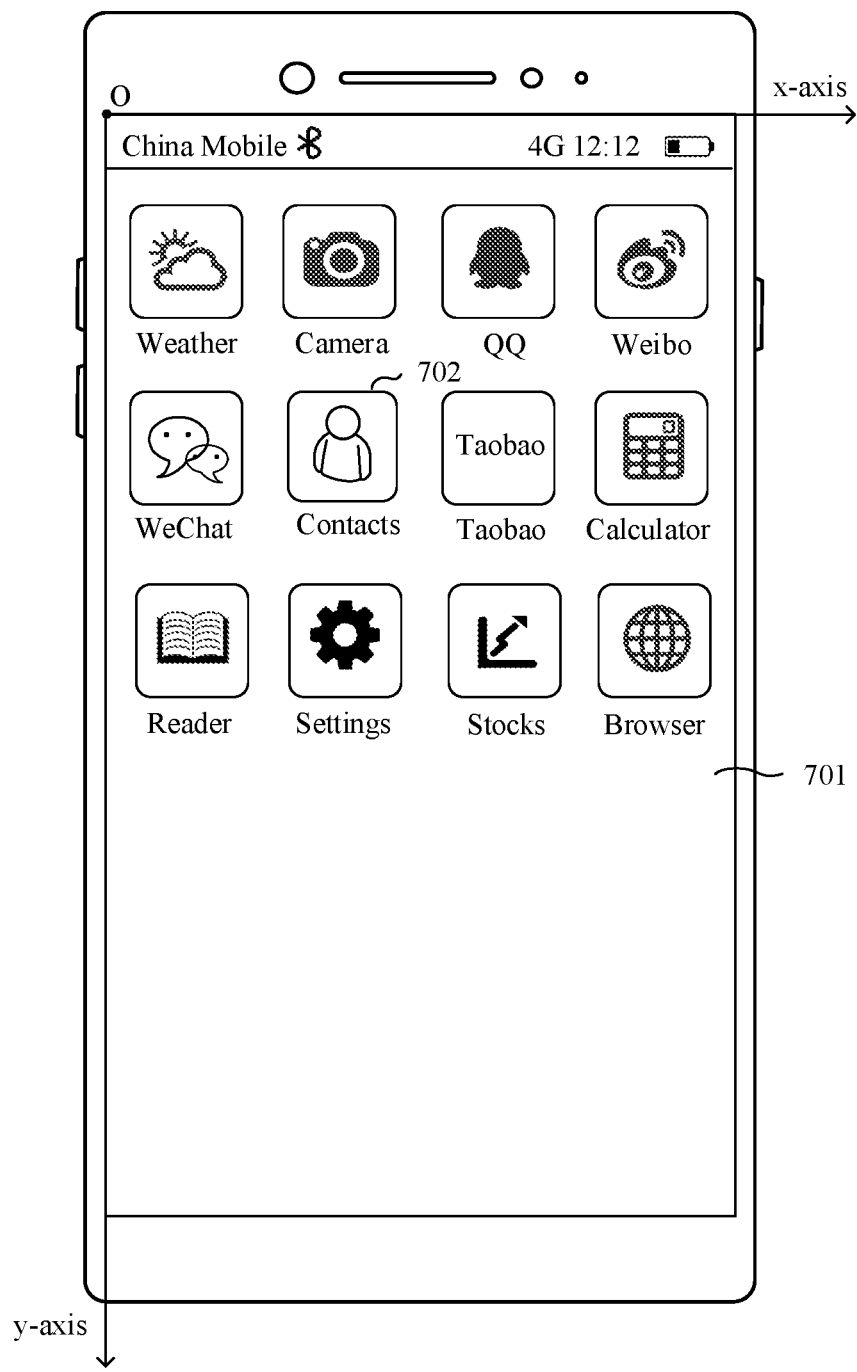

As shown in FIG. 14(b), the mobile phone may display a screen page in the launcher 701 in response to the slide-up operation, where the screen page includes one or more application icons. In this embodiment of this application, the mobile phone may display the application icons on the screen page in a third display manner. The third display manner means that in the launcher, a foreground-layer icon of the application icon moves relative to a background-layer icon along a sliding direction of the current unlocking, so as to simulate a visual effect that the application icon in the launcher moves along or is compressed along the sliding direction of the unlocking.

The application icon 702 in the launcher 701 is used as an example. After detecting that the user enters the slide-up operation to unlock the screen of the mobile phone, in a process of displaying the launcher 701 or after the launcher 701 is displayed, the mobile phone may move the foreground-layer icon of the application icon 702 relative to the background-layer icon along the sliding direction (which is the negative direction of the y-axis) of the slide-up operation in the third display manner.

Optionally, when the foreground-layer icon of the application icon 702 moves relative to the background-layer icon along the negative direction of the y-axis, the mobile phone may further compress the foreground-layer icon or the background-layer icon of the application icon 702. This is not limited in this embodiment of this application.

Similarly, the mobile phone may display each application icon in the launcher 701 in addition to the application icon 702 in the third display manner in response to the slide-up operation. In this way, after the user unlocks the screen by using the slide-up operation, an upward movement or compression visual effect of each application icon in the launcher 701 may be associatively presented, and the slide-up unlocking operation entered by the user in the lock screen interface is associated with a display effect of the application icon in the launcher 701, so that the display effect of the application icon is more realistic.

In addition, after displaying each application icon in the launcher 701 in the third display manner, the mobile phone may automatically display, for each application icon, a reset effect corresponding to the third display manner, so that each application icon in the launcher 701 is restored to a default position and size.

Figure 15A:
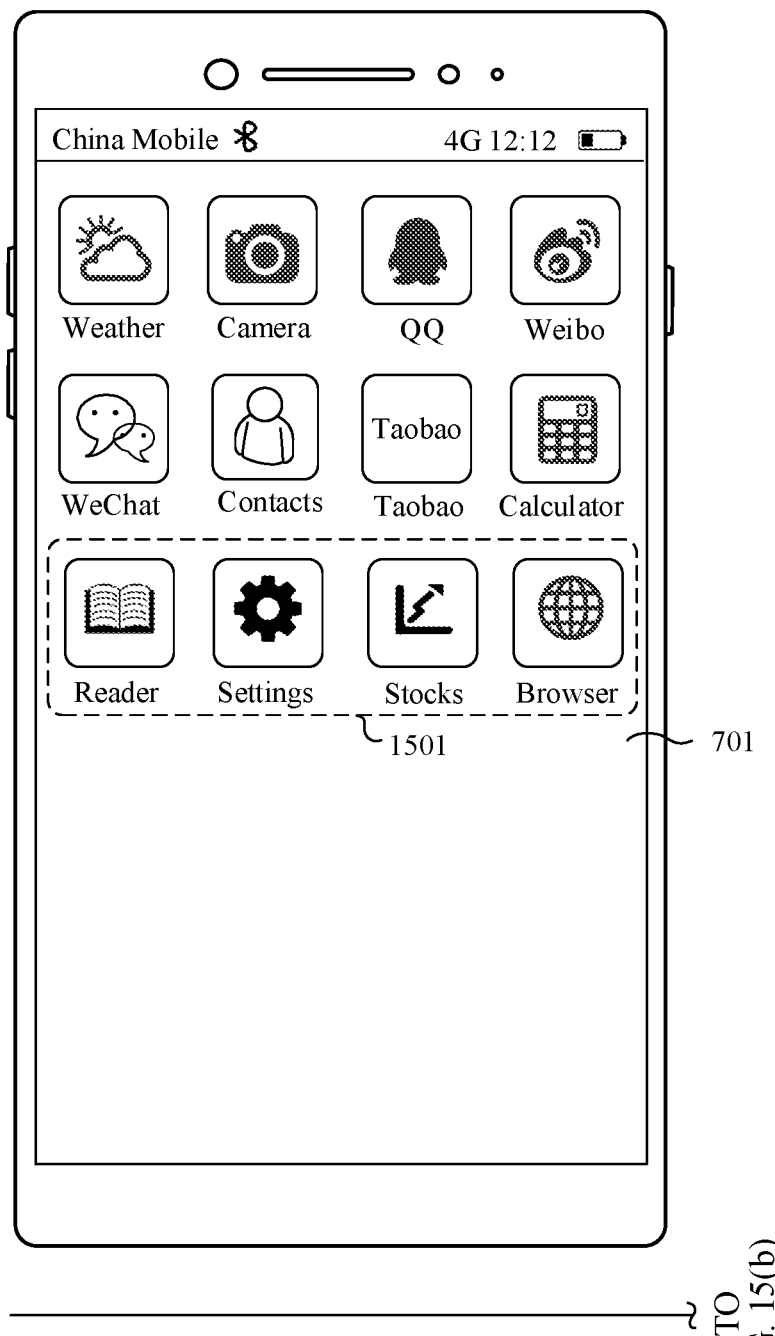
FIG. 15(a) to FIG. 15(c) are a schematic diagram 13 of an application scenario of a method for displaying an application icon according to an embodiment of this application.

In some embodiments, the mobile phone may further sequentially display rows of application icons in the launcher 701 in the third display manner in response to the slide-up operation. For example, as shown in FIG. 15(a), when displaying the launcher 701 in response to the slide-up operation, the mobile phone may first display application icons in the third row 1501 of the launcher 701 in the third display manner, so that the application icons in the third row 1501 present a visual effect of moving along or being compressed along the sliding direction.

Figure 15B:
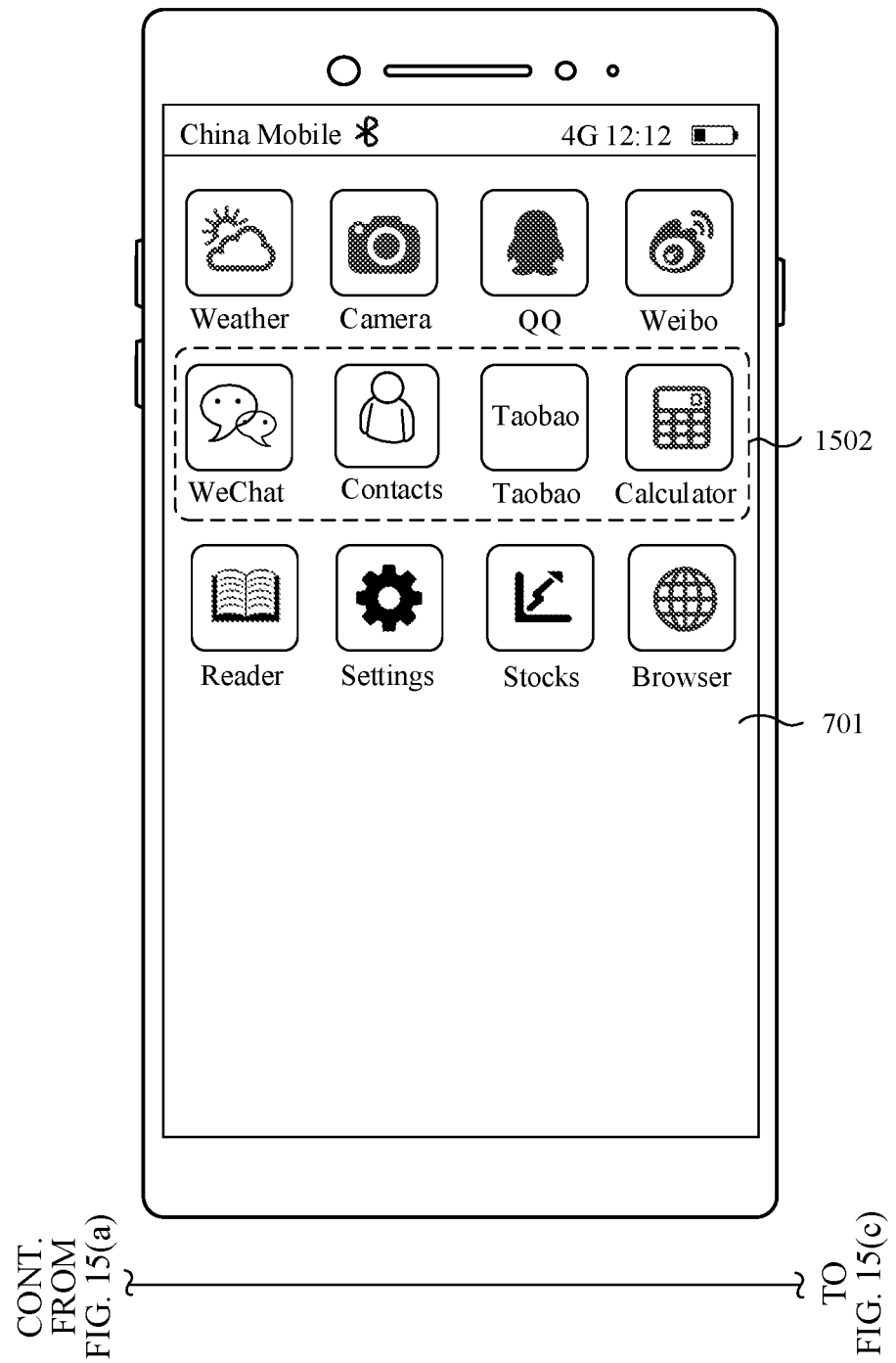

Further, after an interval of a specific time (for example, 100 ms), as shown in FIG. 15(b), the mobile phone may display application icons in the second row 1502 of the launcher 701 in the third display manner, so that the application icons in the second row 1502 present a visual effect of moving along or being compressed along the sliding direction.

Figure 15C:
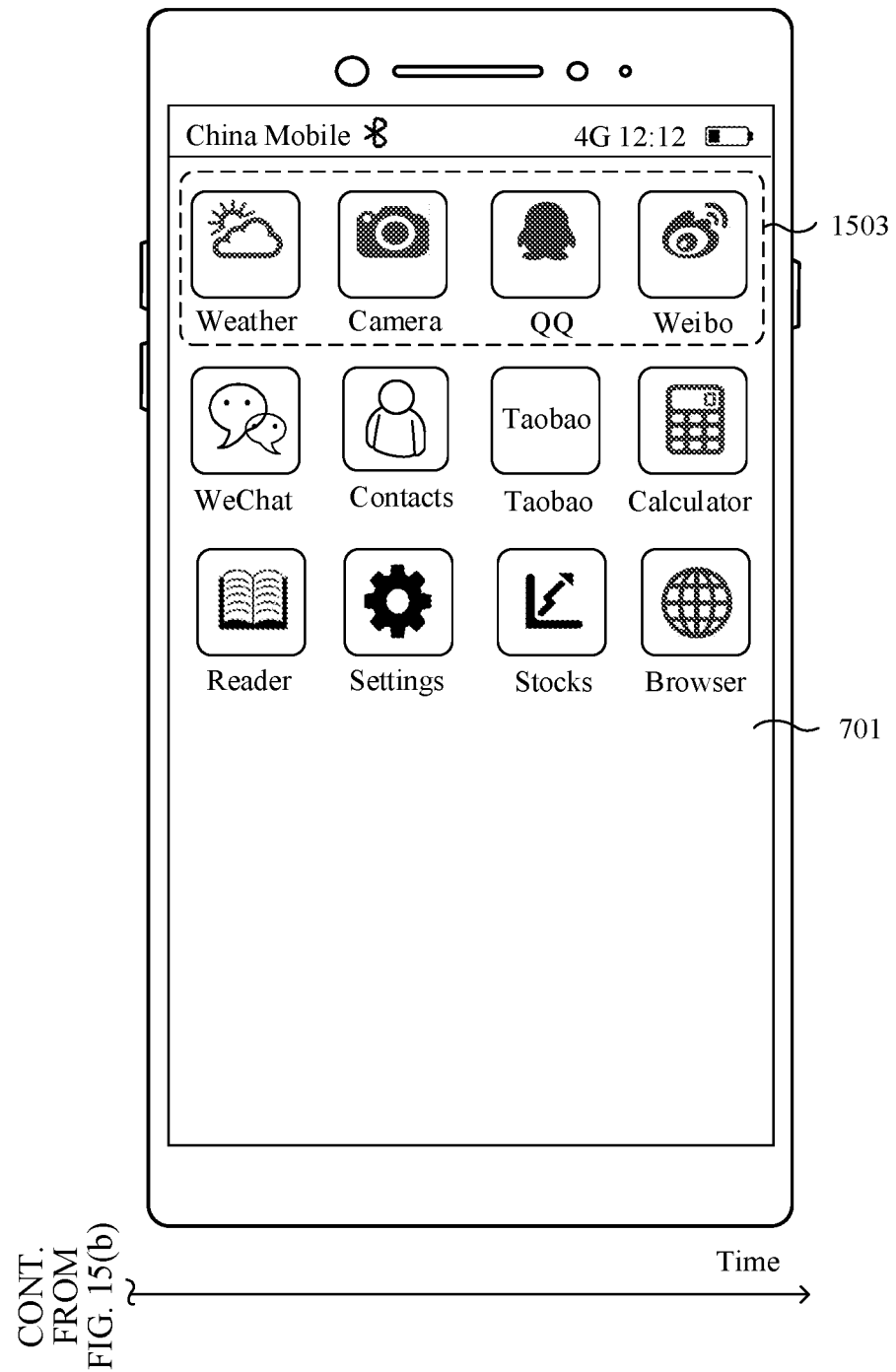

Similarly, starting from the displaying the application icons in the second row 1502 of the launcher 701 in the third display manner by the mobile phone, after an interval of a specific time (for example, 100 ms), as shown in FIG. 15(c), the mobile phone may continue to display application icons in the first row 1503 of the launcher 701 in the third display manner, so that the application icons in the first row 1503 present a visual effect of moving along or being compressed along the sliding direction.

It should be noted that, in the foregoing embodiment, the slide-up operation is used an example for the unlocking operation. It may be understood that when the unlocking operation is a sliding operation in another direction (such as a slide-down operation or a slide-leftward operation), the mobile phone may also move, in the third display manner, the foreground-layer icon of the application icon of the launcher 701 relative to the background-layer icon along a specific sliding direction in the unlocking operation, so as to present a visual effect that the application icon moves along or is compressed along the sliding direction. This is not limited in this embodiment of this application.

Figure 16A:
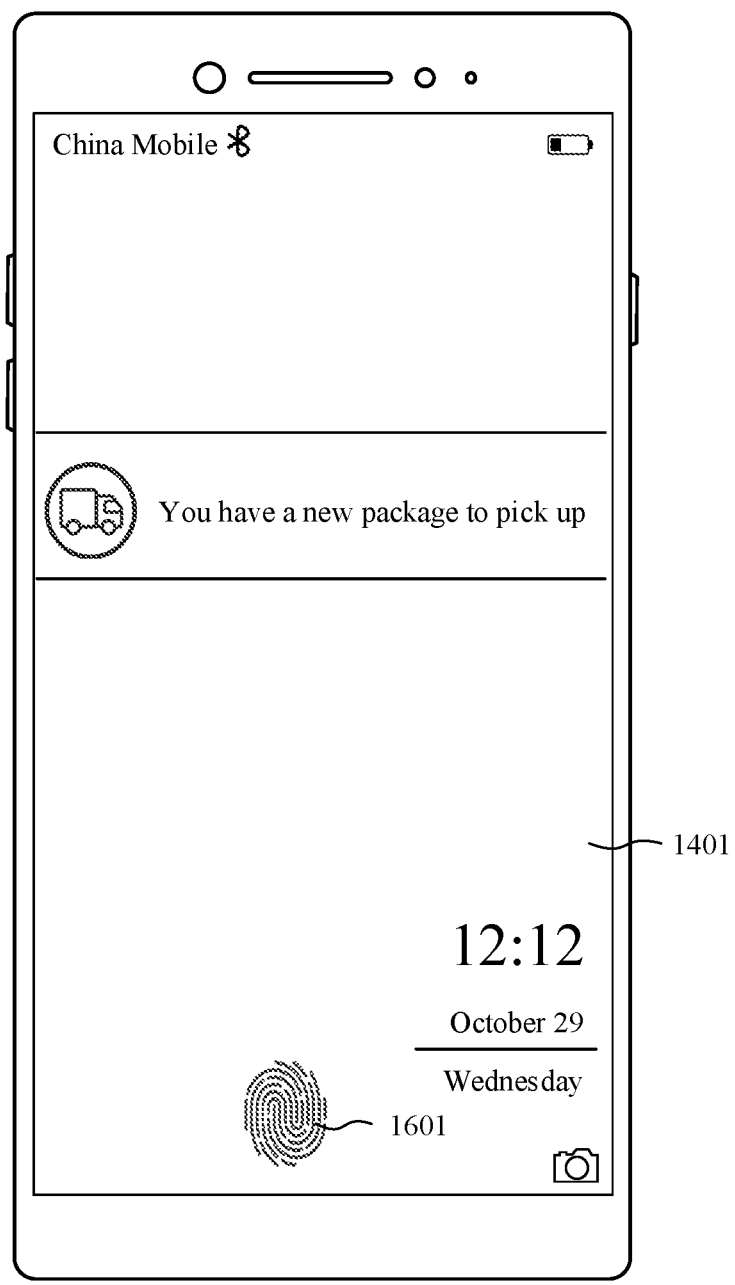
FIG. 16(a) and FIG. 16(b) are a schematic diagram 14 of an application scenario of a method for displaying an application icon according to an embodiment of this application.

In some other implementations, the user may enter a correct fingerprint on the screen of the mobile phone to unlock the screen of the mobile phone, so as to enter the launcher of the mobile phone. A mobile phone with an under-display fingerprint function is used as an example. As shown in FIG. 16(a), a fingerprint component may be disposed below an unlock position 1601 preset on a touchscreen of the mobile phone. This fingerprint collection component may send a collected fingerprint to a processor of the mobile phone, so that the processor performs processing (for example, fingerprint verification) on the collected fingerprint. A main component of the fingerprint component may include a fingerprint sensor, and the fingerprint sensor may use any type of sensing technology, including but not limited to an optical, capacitive, piezoelectric, or ultrasonic sensing technology. The mobile phone may detect, by using the fingerprint component, whether the user enters a correct fingerprint at the unlock position 1601 of the lock screen interface 1401. If the user enters a correct fingerprint (that is, the fingerprint verification succeeds), the mobile phone may unlock the screen of the mobile phone. After unlocking the screen of the mobile phone, the mobile phone may display a screen page in the launcher 701 and application icons on the screen page.

Figure 16B:
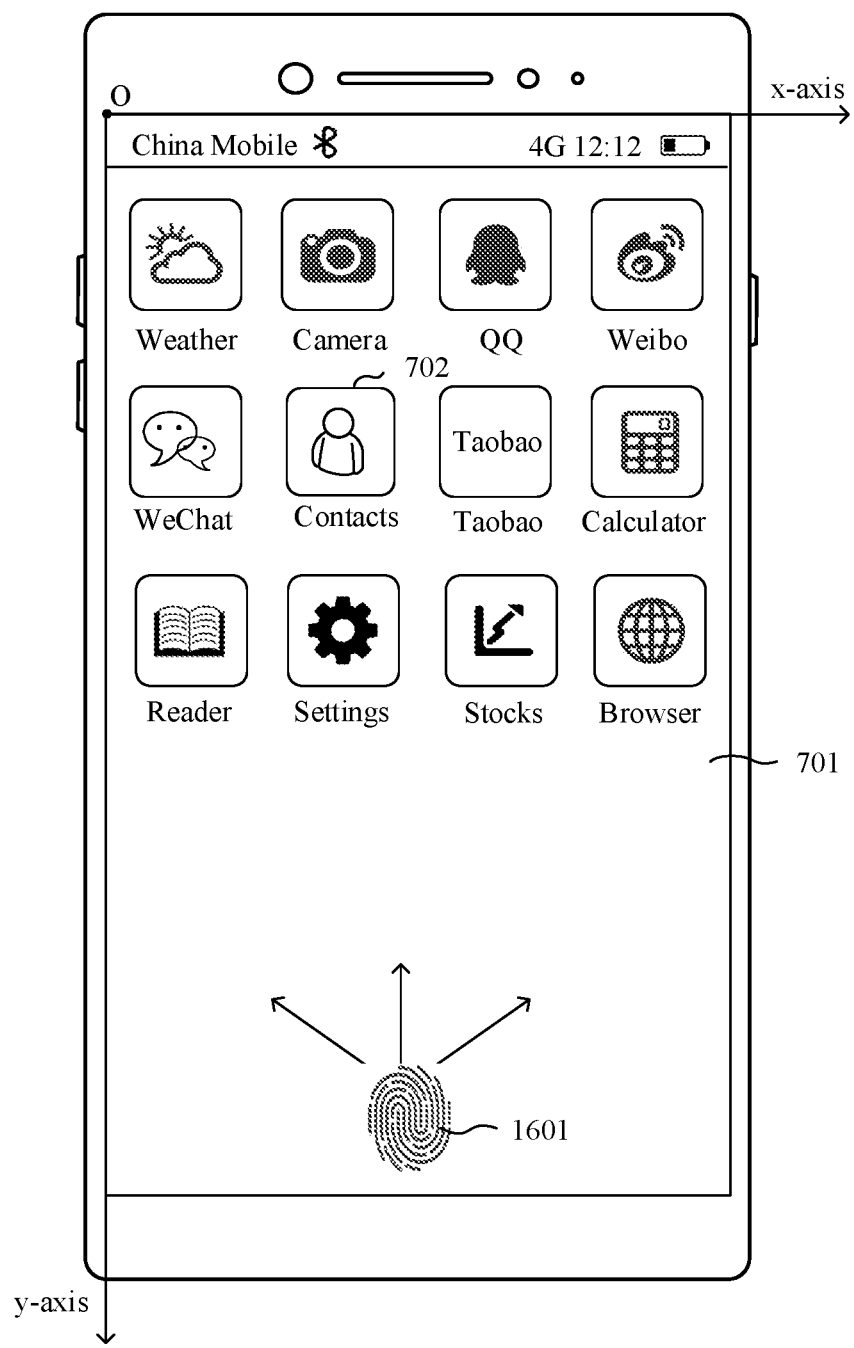

As shown in FIG. 16(b), after verification of a fingerprint entered by the user at the unlock position 1601 succeeds, the mobile phone may display application icons in the launcher 701 in a fourth display manner. The fourth display manner means that a foreground-layer icon of the application icon in the launcher moves relative to a background-layer icon along a direction away from the unlock position 1601, so as to simulate a visual effect that the application icon in the launcher moves away from or is compressed away from the unlock position 1601.

Optionally, when the foreground-layer icon of the application icon moves relative to the background-layer icon along the direction away from the unlock position 1601, the mobile phone may further compress the foreground-layer icon or the background-layer icon of the application icon. This is not limited in this embodiment of this application.

For example, a central point at the bottom of the screen of the mobile phone is used as the unlock position 1601. After it is detected that the user enters a correct fingerprint at the unlock position 1601, as still shown in FIG. 16(b), when displaying the application icon 702, the mobile phone may move the foreground-layer icon of the application icon 702 along a direction in which the unlock position 1601 points to the application icon 702, so as to present a display effect that the application icon 702 moves away from or is compressed away from the unlock position 1601. Similarly, when displaying each application icon in the launcher 701, the mobile phone may display the application icon in the fourth display manner.

The unlock position 1601 shown in FIG. 16(*b*) is still used as an example. The direction in which the application icon in the launcher 701 moves away from the unlock position 1601 may be a direction of radiating from the unlock position 1601 toward surrounding positions, or may be a direction away from the unlock position 1601 along the y-axis direction (or the x-axis direction).

In this way, after the user enters the fingerprint at the unlock position 1601 to unlock the screen of the mobile phone, a visual effect of each application icon moves away from or is compressed away from the unlock position 1601 may be presented in the launcher 701, so as to simulate a display effect that the application icon in the launcher 701 is pushed away after being tapped by the user at the unlock position 1601.

Similar to the foregoing embodiment, the mobile phone may further present compression and movement effects to different extents for different application icons based on distances between the application icons and the unlock position 1601, so as to implement movement or compression effects to different extents. Generally, an icon closer to the unlock position 1601 is compressed to a greater extent and moved by a larger distance in the fourth display manner, so as to more realistically present a display effect that an application icon at each position in the launcher 701 is pushed away after being tapped by the user at the unlock position 1601.

In addition, when displaying each application icon in the launcher 701, the mobile phone may further change a parameter such as transparency, a color, or a size of the application icon. This is not limited in this embodiment of this application. For example, after unlocking the screen, the mobile phone may display application icons in the launcher 701 row by row by changing transparency of the application icons.

In some embodiments, when the user enters a page turning operation (for example, a sliding operation) in the launcher, the mobile phone may switch between different screen pages in the launcher in response to the page turning operation. In this case, positions of application icons on different screen pages also move accordingly. Similar to the foregoing embodiment, the mobile phone may also display the application icons in the launcher by using the foregoing movement or compression display effect, and associate a display effect of each application icon in the launcher with a page turning operation entered by the user.

Figure 17:
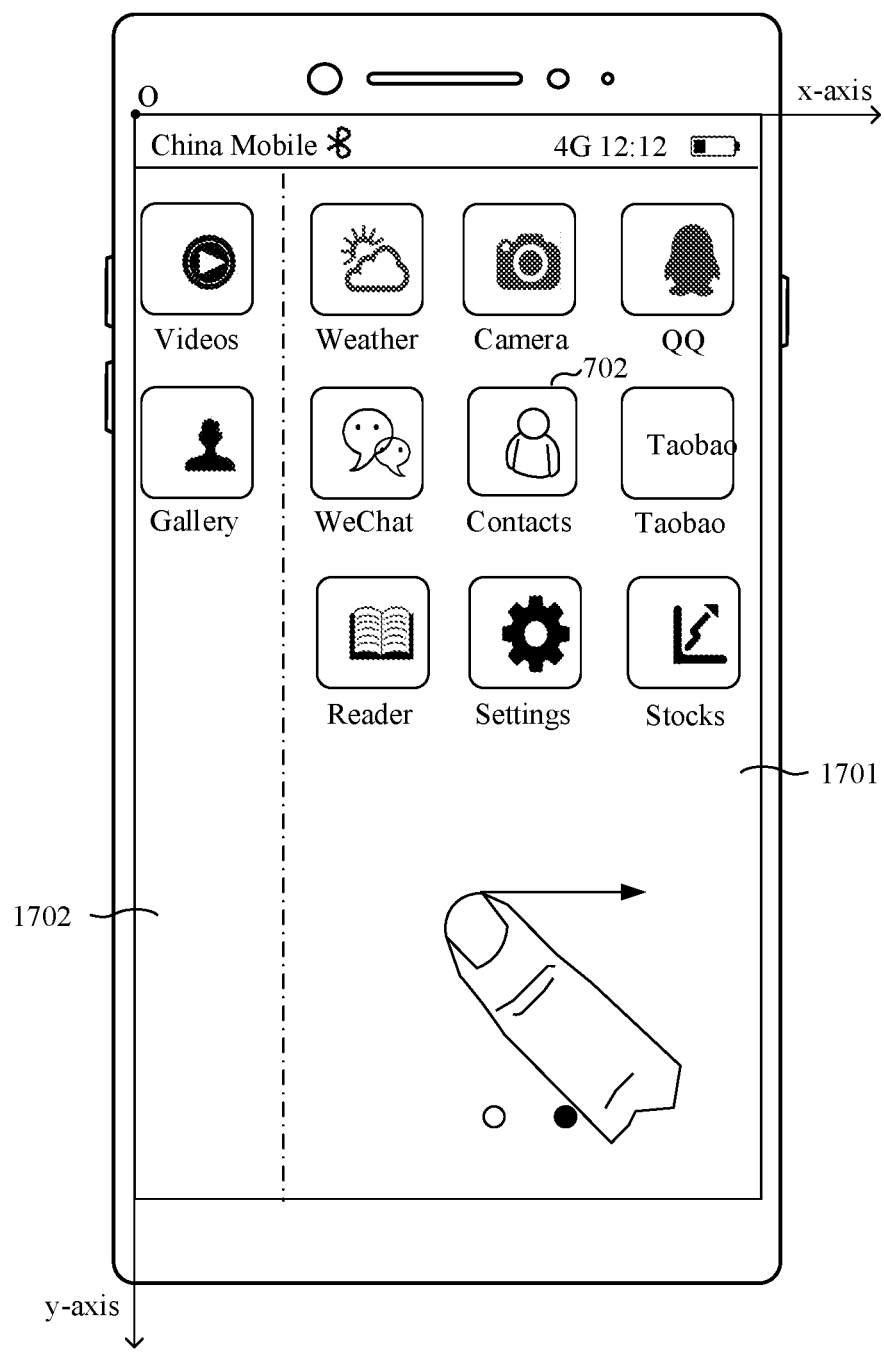
FIG. 17 is a schematic diagram 15 of an application scenario of a method for displaying an application icon according to an embodiment of this application.

For example, as shown in FIG. 17, when the mobile phone detects that the user enters a slide-rightward page turning operation on a first screen page 1701 of the launcher, the mobile phone may move application icons on the first screen page 1701 rightward based on a sliding direction or a sliding distance of the page turning operation. For example, each time when a finger of the user slides rightward by 10 pixel units, the mobile phone may synchronously move each application icon in the launcher 701 rightward by 10 pixel units. In addition, the mobile phone may gradually display a second screen page 1702 adjacent to the first screen page 1701.

In this embodiment of this application, when the mobile phone moves the application icons in the launcher in response to the page turning operation, still as shown in FIG. 17, the mobile phone may further display the application icons in the launcher in a fifth display manner. The fifth display manner means that a foreground-layer icon of the application icon in the launcher moves relative to a background-layer icon along the sliding direction of the current page turning operation, so as to simulate a visual effect that the application icons in the launcher move along or are compressed along the sliding direction of the page turning operation.

Optionally, when the foreground-layer icon of the application icon moves relative to the background-layer icon along the sliding direction of the page turning operation, the mobile phone may further compress the foreground-layer icon or the background-layer icon of the application icon. This is not limited in this embodiment of this application.

The application icon 702 shown in FIG. 17 is used as an example. When the mobile phone moves the application icon 702 on the first screen page 1701 rightward in response to the page turning operation entered by the user, the mobile phone may further move the foreground-layer icon of the application icon 702 relative to the background-layer icon along the sliding direction (which is the positive direction of the x-axis) of the page turning operation.

Similarly, the mobile phone may display each application icon on the first screen page 1701 in addition to the application icon 702 in the fifth display manner in response to the page turning operation. In this way, after the user enters the slide-rightward page turning operation, a rightward movement or compression visual effect of each application icon on the first screen page 1701 may be associatively presented, so as to simulate a three-dimensional stereoscopic effect of a left side surface of the application icon that can be seen when the application icon moves rightward.

Further, when displaying each application icon on the first screen page 1701 in the fifth display manner, the mobile phone may also display each application icon on the second screen page 1702 in the fifth display manner. Certainly, the mobile phone may alternatively not display the application icon on the second screen page 1702 in the fifth display manner. This is not limited in this embodiment of this application.

Similar to the foregoing embodiment, the slide-rightward page turning operation entered by the user is used as an example. The mobile phone may present compression and movement effects to different extents for different application icons in the fifth display manner based on distances between the application icons and a right boundary of the launcher, so as to implement moving or compression to different extents. Generally, an icon closer to the right boundary of the launcher is compressed to a greater extent and moved by a larger distance in the fifth display manner, so as to more realistically present a movement or compression display effect generated by pulling the application icon during page turning.

In some other embodiments, the slide-rightward page turning operation entered by the user is still used as an example. The mobile phone may alternatively sequentially display application icons in the fifth display manner based on positions to which the application icons are moved in the launcher.

Figure 18A:
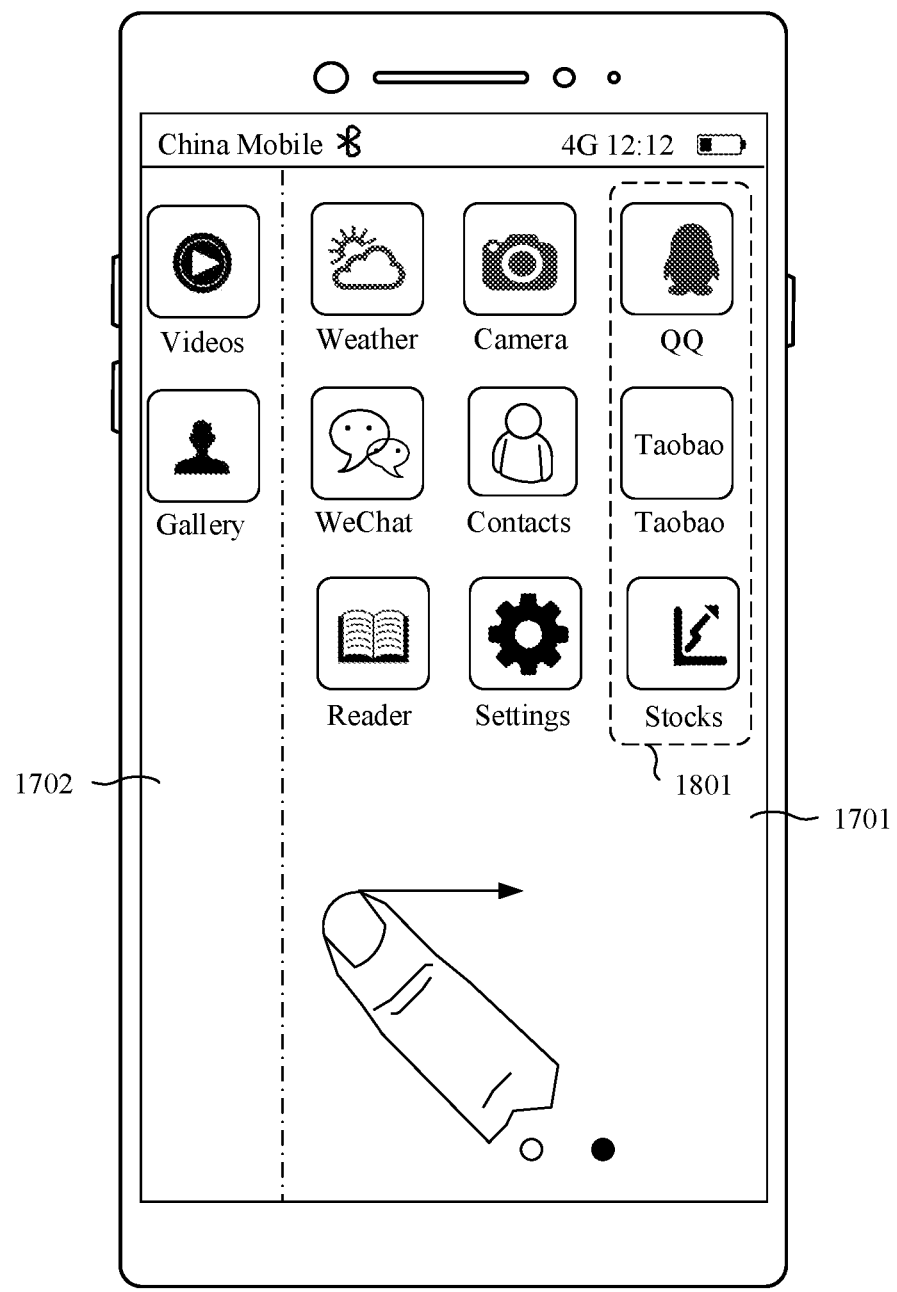
FIG. 18(a) to FIG. 18(c) are a schematic diagram 16 of an application scenario of a method for displaying an application icon according to an embodiment of this application.
Figure 18B:
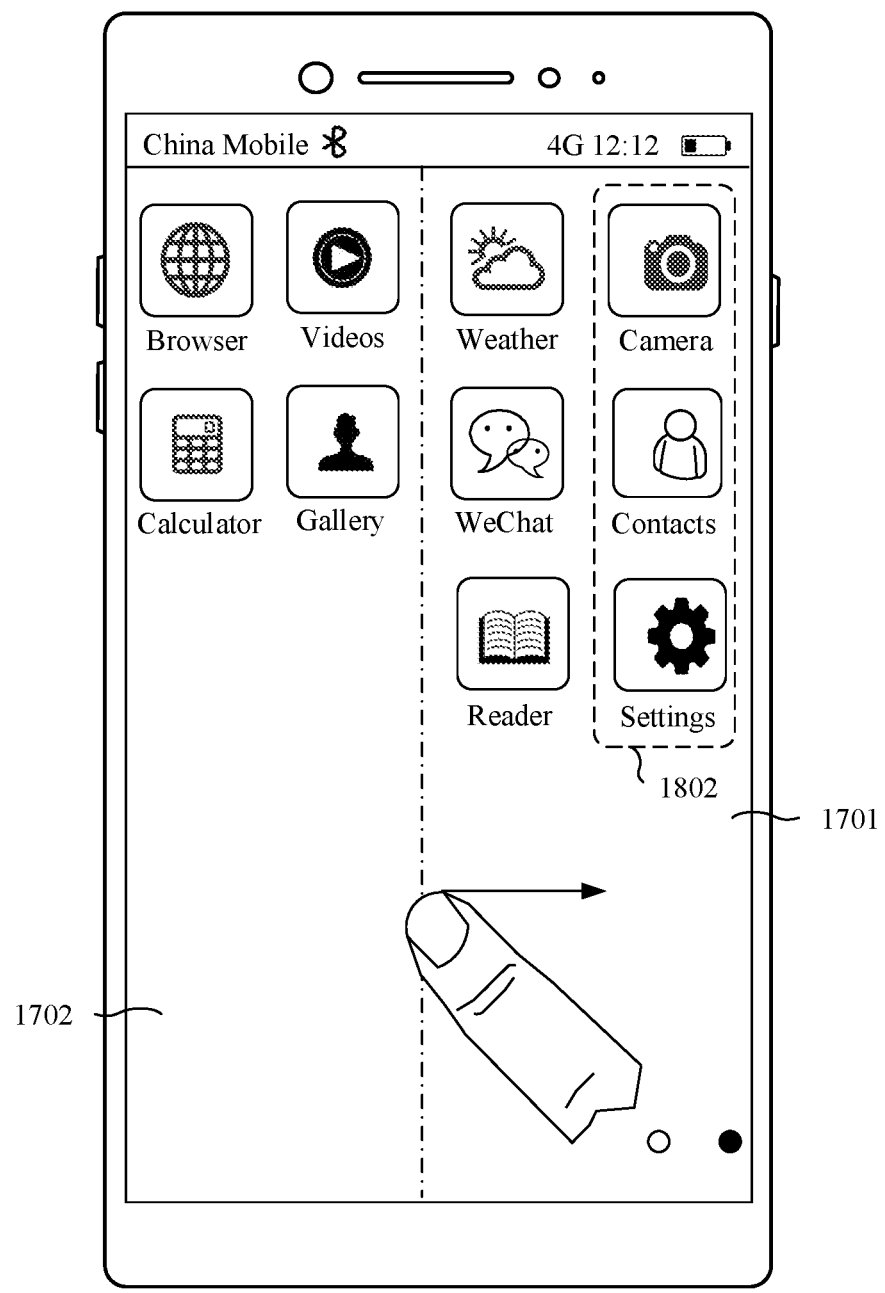
Figure 18C:
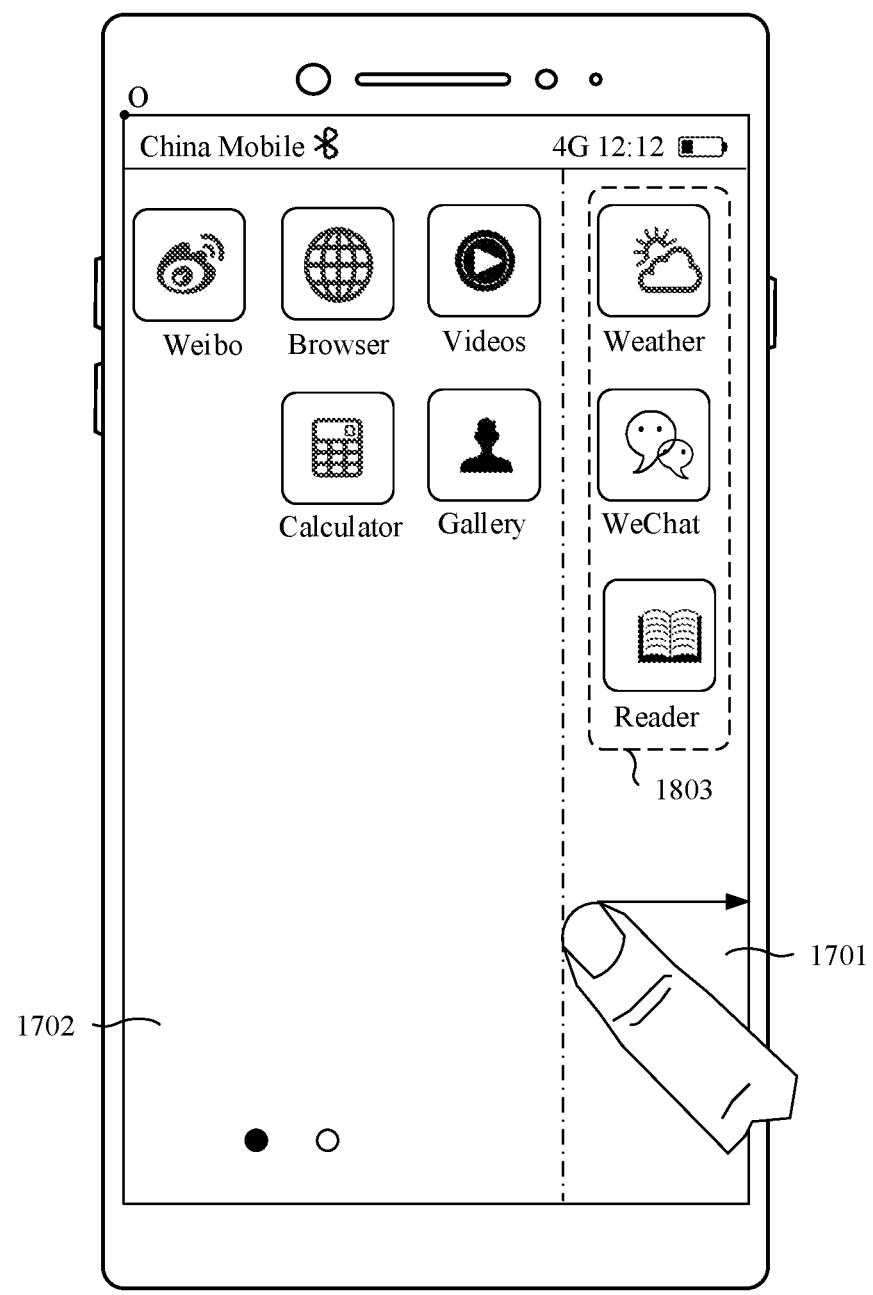

As shown in FIG. 18(*a*), when the mobile phone moves application icons in the first column 1801 on the first screen page 1701 to the right boundary of the launcher, the mobile phone may display the application icons in the first column 1801 in the fifth display manner, so that the application icons in the first column 1801 present a visual effect of moving along or being compressed along a page turning direction (namely, rightward). When the mobile phone moves application icons in the second column 1802 on the first screen page 1701 to the right boundary of the launcher, as shown in FIG. 18(*b*), the mobile phone may display the application icons in the second column 1802 in the fifth display manner, so that the application icons in the second column 1802 present a visual effect of moving along or being compressed along the page turning direction (namely, rightward). Similarly, when the mobile phone moves application icons in the third column 1803 in the launcher to the right boundary of the launcher, as shown in FIG. 18(*c*), the mobile phone may display the application icons in the third column 1803 in the fifth display manner, so that the application icons in the third column 1803 present a visual effect of moving along or being compressed along the page turning direction (namely, rightward).

Certainly, if the user enters a slide-leftward page turning operation, the mobile phone may present, in the launcher in the fifth display manner, a visual effect that the application icon moves leftward or is compressed leftward, so as to simulate a three-dimensional stereoscopic effect of a right wide surface of the application icon that can be seen when the application icon moves rightward.

In some other embodiments, when the mobile phone moves the application icon in response to the page turning operation, the mobile phone may further perform staggered displacement on the foreground-layer icon and the background-layer icon of the application icon in the launcher, so as to implement a staggered display effect of the application icon.

Figure 19A:
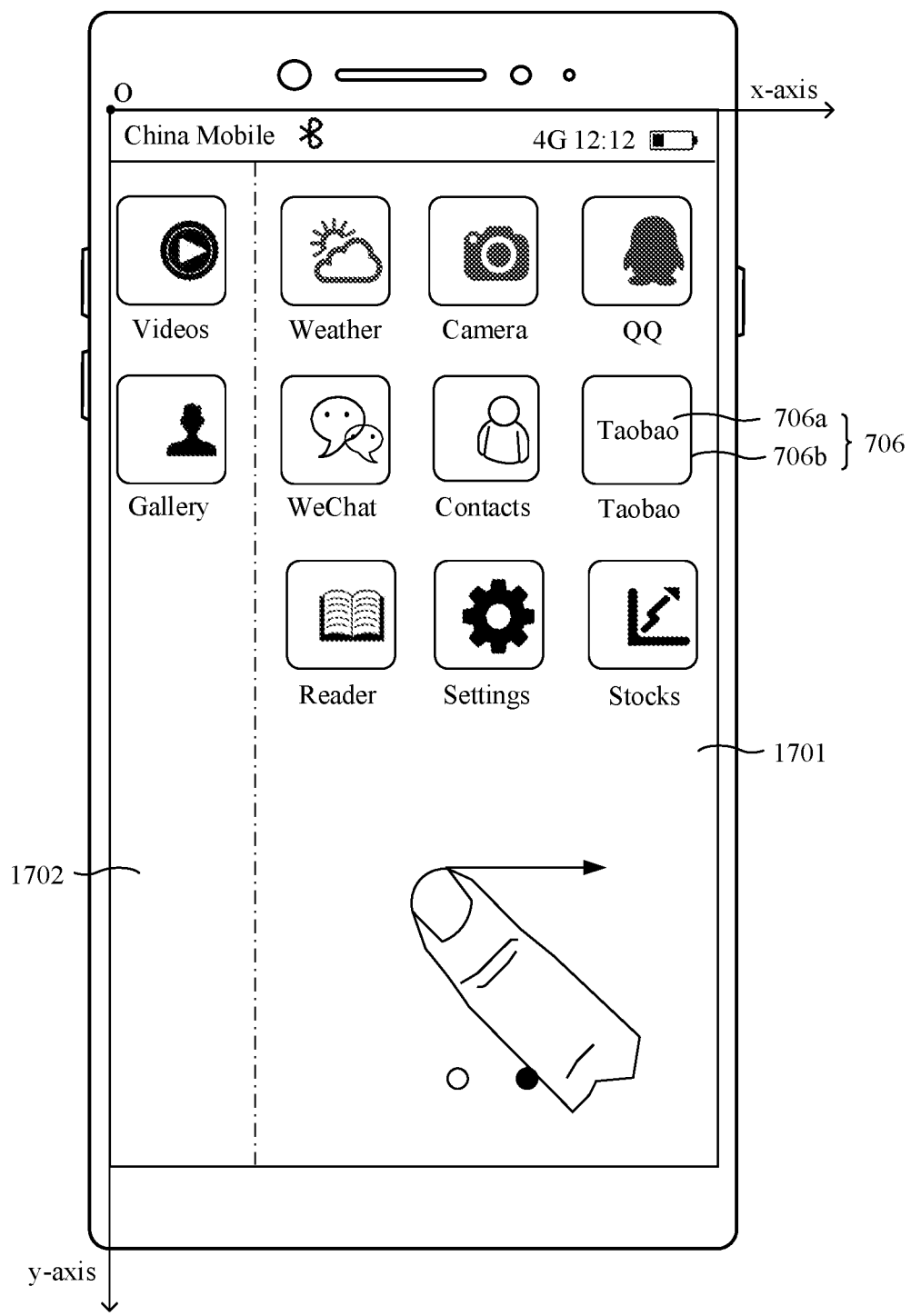
FIG. 19(a) and FIG. 19(b) are a schematic diagram 17 of an application scenario of a method for displaying an application icon according to an embodiment of this application.
Figure 19B:
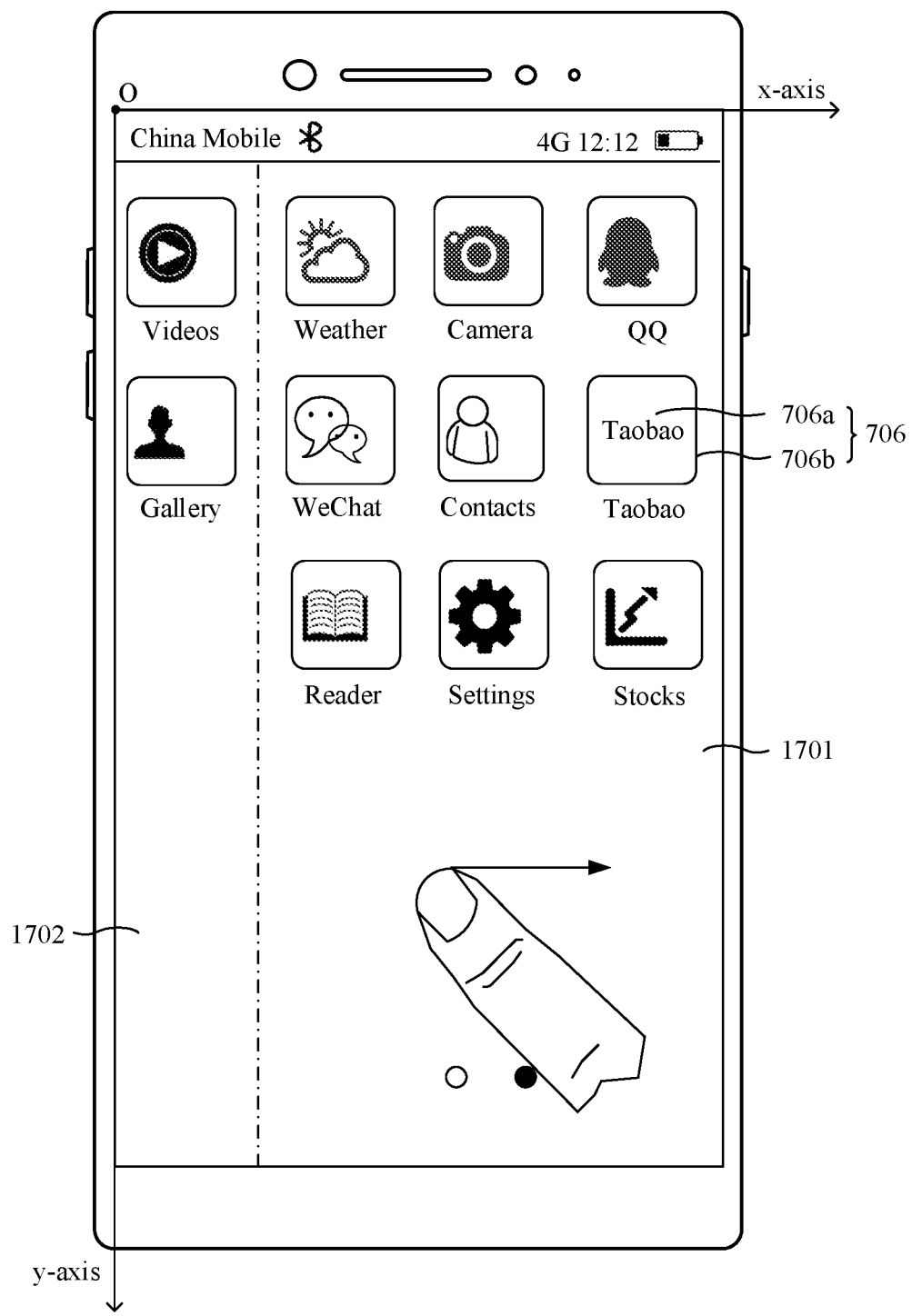

For example, as shown in FIG. 19(*a*), the application icon 706 on the first screen page 1701 in the launcher is used as an example. The application icon 706 includes a mask (not shown) located in a bottom layer, a background-layer icon 706*a* located on the mask, and a foreground-layer icon 706*b* located on the background-layer icon 706*a*. Each time when it is detected that a finger of the user slides rightward by 10 pixel units, the mobile phone may synchronously move the mask of the application icon 706 rightward by 10 pixel units, and at the same time, the mobile phone may move the background-layer icon 706*a* of the application icon 706 rightward by 12 pixel units, and move the foreground-layer icon 706*b* of the application icon 706 rightward by 14 pixel units. For each application icon on the first screen page 1701, the mobile phone may implement, according to the foregoing method, a staggered effect of layered relative movement of the application icon. Optionally, for each application icon on the second screen page 1702, the mobile phone may also implement, according to the foregoing method, a staggered effect of a layered relative movement of the application icon. In this way, when the user enters a page turning operation in the launcher, each application icon may present a visual effect that an upper-layer icon moves faster than a lower-layer icon.

Alternatively, as shown in FIG. 19(*b*), the application icon 706 on the first screen page 1701 in the launcher is still used as an example. Each time when it is detected that a finger of the user slides rightward by 10 pixel units, the mobile phone may synchronously move the mask of the application icon 706 rightward by 10 pixel units, and at the same time, the mobile phone may move the background-layer icon 706*a* of the application icon 706 rightward by 8 pixel units, and move the foreground-layer icon 706*b* of the application icon 706 rightward by 6 pixel units. For each application icon on the first screen page 1701, the mobile phone may implement, according to the foregoing method, a staggered effect of layered relative movement of the application icon. Optionally, for each application icon on the second screen page 1702, the mobile phone may also implement, according to the foregoing method, a staggered effect of a layered relative movement of the application icon. In this way, when the user enters a page turning operation in the launcher, each application icon may present a visual effect that an upper-layer icon moves slower than a lower-layer icon.

It should be noted that when displaying the launcher, the mobile phone may display a preset dock bar as well in the launcher, and one or more application icons may also be set on the dock bar. Therefore, when displaying application icons in the launcher according to the various display manners in the foregoing embodiments, the mobile phone may retain an original display manner of the application icon on the dock bar. In other words, the mobile phone may display the application icon on the dock bar without using the method for displaying an application icon provided in this application. This is not limited in this embodiment of this application.

In some embodiments, when the user drags an application icon in the launcher to move, application icons around the application icon also move associatively. In this case, the mobile phone may also display the application icons around the application icon by using the foregoing movement or compression display effect, so as to directionally prompt the user with impact of the currently dragged application icon on other surrounding application icons.

Figure 20A:
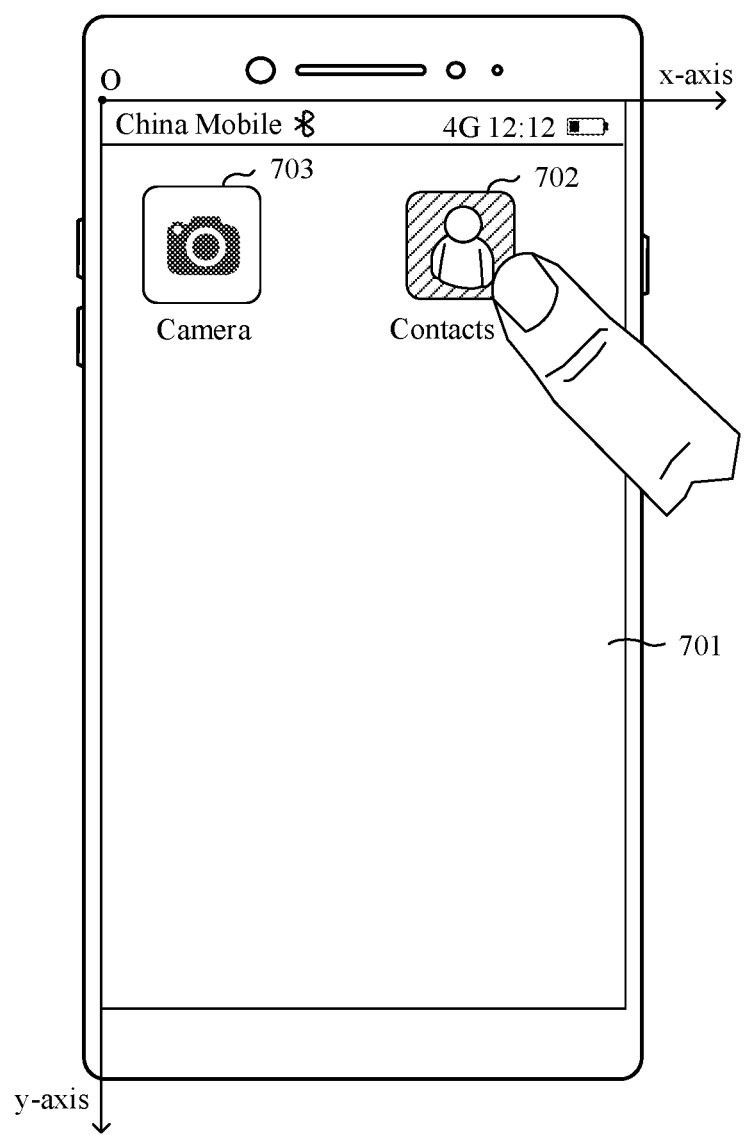
FIG. 20(a) and FIG. 20(b) are a schematic diagram 18 of an application scenario of a method for displaying an application icon according to an embodiment of this application.
Figure 20B:
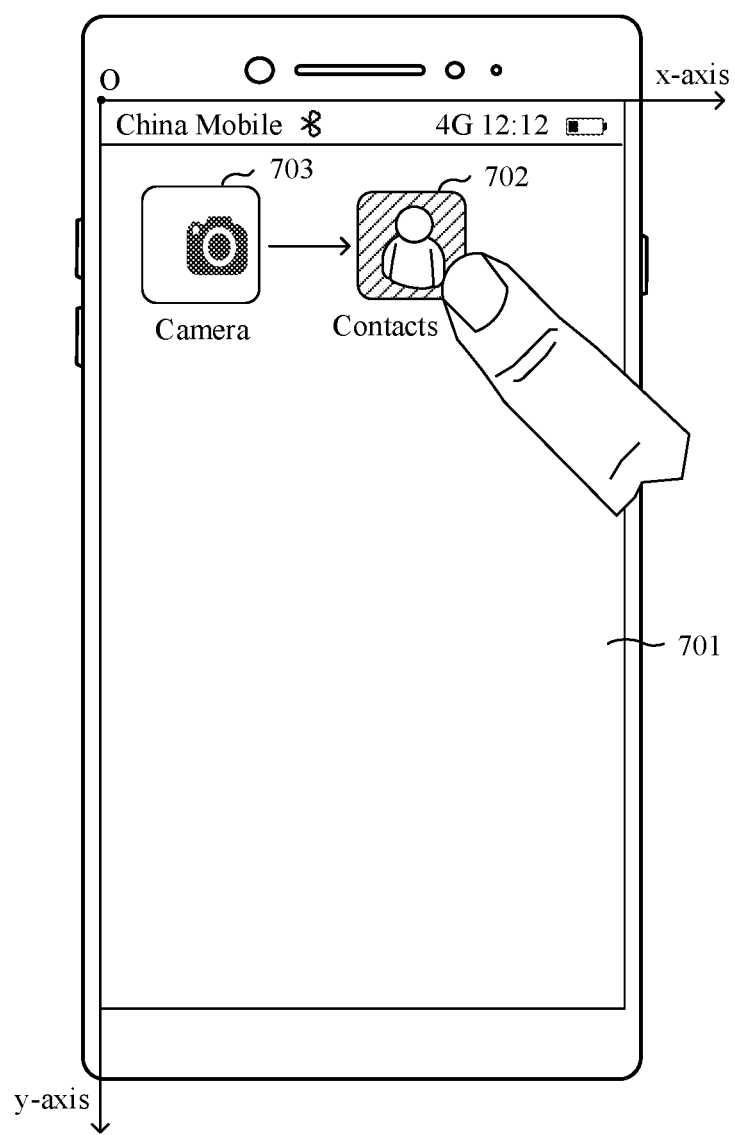

For example, as shown in FIG. 20(*a*), after detecting that the user enters a touch and hold operation on the application icon 702 in the launcher 701, the mobile phone may display, for the operated application icon 702, a display effect of tapping the icon. For example, the mobile phone may reduce a size of the application icon 702 to 90%, and deepen a color of the application icon 702, so as to prompt the user that the application icon 702 in the launcher 701 is selected.

Subsequently, as shown in FIG. 20(*b*), if it is detected that the user drags the application icon 702 to move toward the application icon 703 in the launcher 701, the mobile phone may display the application icon 703 in a sixth display manner. The sixth display manner means that an application icon (for example, the application icon 703) moves along or is compressed along a direction toward the dragged application icon (for example, the application icon 702).

For example, still as shown in FIG. 20(*b*), when detecting that the user drags the application icon 702 to move toward the application icon 703 in the launcher 701, the mobile phone may move the foreground-layer icon of the application icon 703 relative to the background-layer icon along a direction (which is the positive direction of the x-axis) in which the application icon 703 points to the application icon 702. Alternatively, when the foreground-layer icon of the application icon 703 moves relative to the background-layer icon, the foreground-layer icon of the application icon 703 is compressed.

It can be learned that when the application icon 702 moves toward the application icon 703, the application icon 702 dragged by a finger of the user may pull the application icon 703 around the application icon 702, so as to present a visual effect of moving toward or being compressed toward the application icon 702. In this way, the mobile phone may associate the dragging operation of dragging the application icon by the user with a display effect of the application icon in the launcher 701.

Figure 21A:
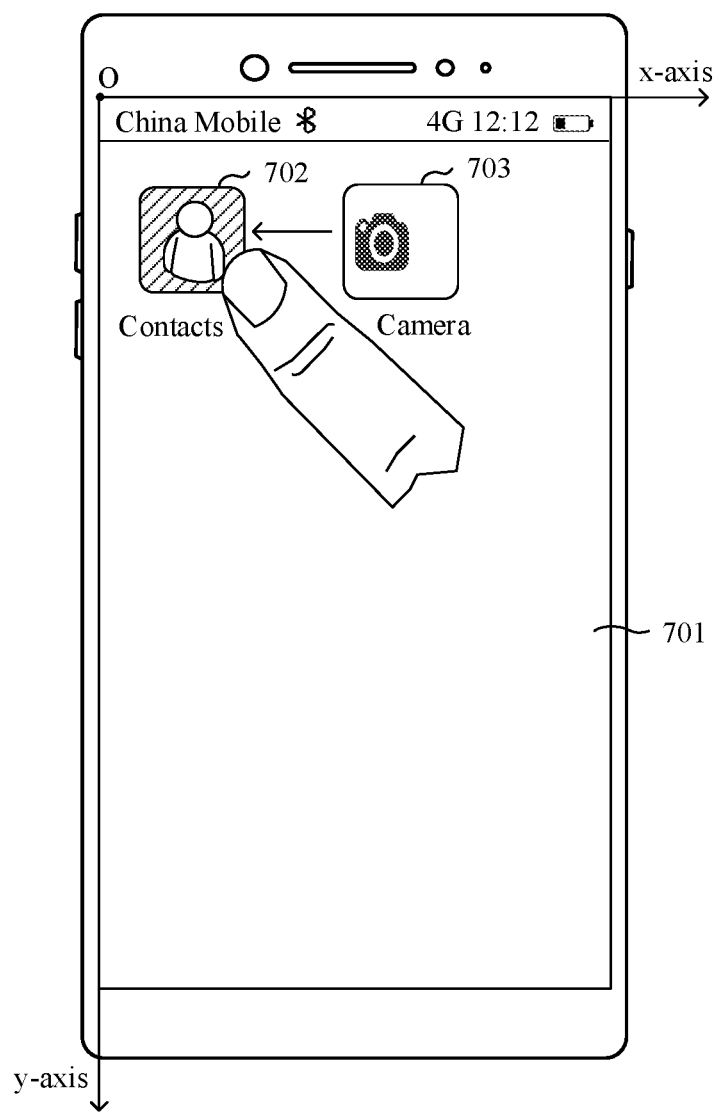
FIG. 21(a) and FIG. 21(b) are a schematic diagram 19 of an application scenario of a method for displaying an application icon according to an embodiment of this application.

Further, as shown in FIG. 21(*a*), when the user drags the application icon 702 to a position at which the application icon 703 is located, the application icon 703 may be moved to a position at which the application icon 702 is originally located. In this process, the mobile phone may also display the application icon 703 in the sixth display manner, so that the application icon 703 presents a visual effect of moving toward or being compressed toward the application icon 702. For example, when the application icon 703 moves along a direction away from the application icon 702, the mobile phone may move the foreground-layer icon of the application icon 703 along the direction (which is the positive direction of the x-axis) in which the application icon 703 points to the application icon 702, so as to present a visual effect that the application icon 703 is pulled by the application icon 702 dragged by the user to move toward or to be compressed toward the application icon 702.

Figure 21B:
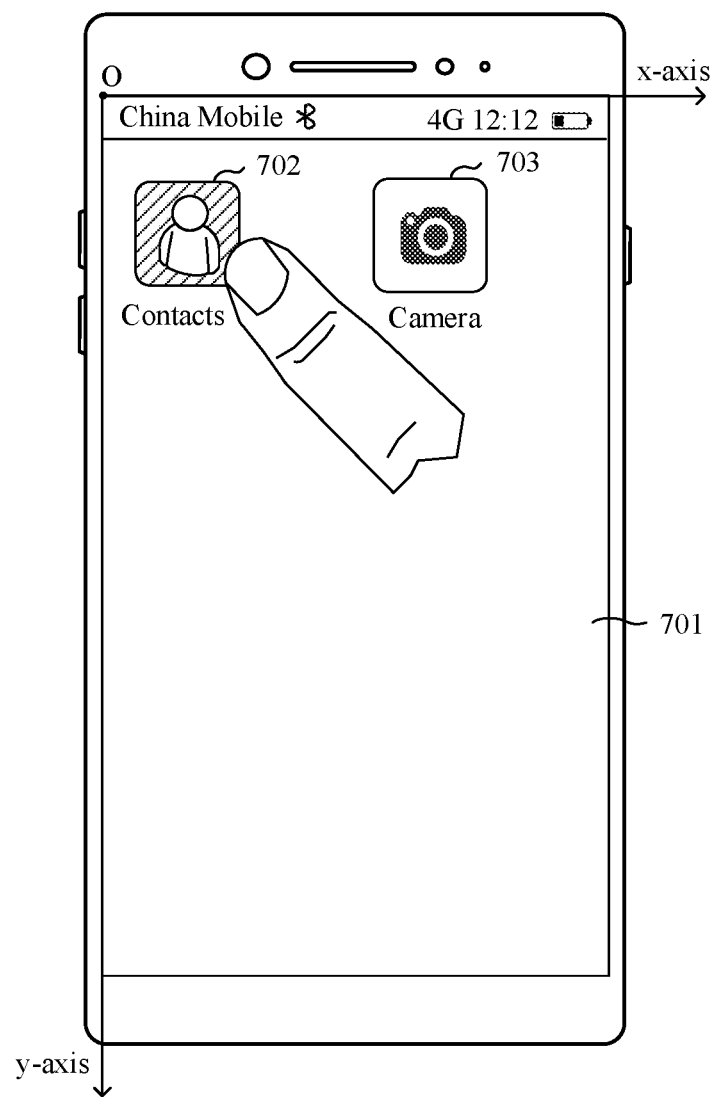

In addition, after displaying the application icon 703 in the sixth display manner, the mobile phone may automatically display, for the application icon 703, a reset effect corresponding to the sixth display manner. In this case, as shown in FIG. 21(b), after the application icon 703 is moved to the position at which the application icon 702 is originally located, the application icon 703 may be restored to a default display state in the launcher 701 by using the reset effect.

In some embodiments, when the user is dragging the application icon 702 to move, if it is detected that the finger of the user leaves the application icon 702, the mobile phone needs to return the application icon 702 to the launcher 701. In this case, the mobile phone may display the application icons around the application icon 702 in the second display manner based on the related description of the second display manner in the foregoing embodiment, so as to simulate a display effect that the application icons around the application icon 702 are pushed away by the returned application icon 702, and prompt the user that the currently dragged application icon 702 is returned to the launcher 701.

In some embodiments, when the user deletes an application icon in the launcher, because the application icon includes a foreground-layer icon and a background-layer icon, the mobile phone may display preset deletion effects respectively for the foreground-layer icon and the background-layer icon of the application icon, so as to present a visual effect of staggered movement during deletion of the application icon.

Figure 22:
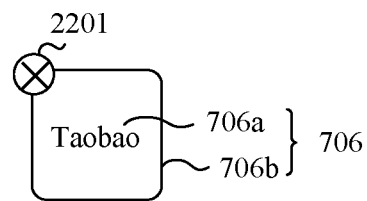
FIG. 22 is a schematic diagram 20 of an application scenario of a method for displaying an application icon according to an embodiment of this application.

For example, as shown in FIG. 22, the application icon 706 of the Taobao app includes a foreground-layer icon 706a and a background-layer icon 706b. When the mobile phone enters an application uninstallation mode, the mobile phone may display a deletion badge 2201 on the application icon 706. If it is detected that the user taps the deletion badge 2201, it indicates that the user needs to delete the application icon 706 from the launcher 701.

In this case, the mobile phone may display the foreground-layer icon 706a of the application icon 706 based on a first deletion effect, and the mobile phone may display the background-layer icon 706b of the application icon 706 based on a second deletion effect. The first deletion effect and the second deletion effect may be the same or different.

Figure 23:
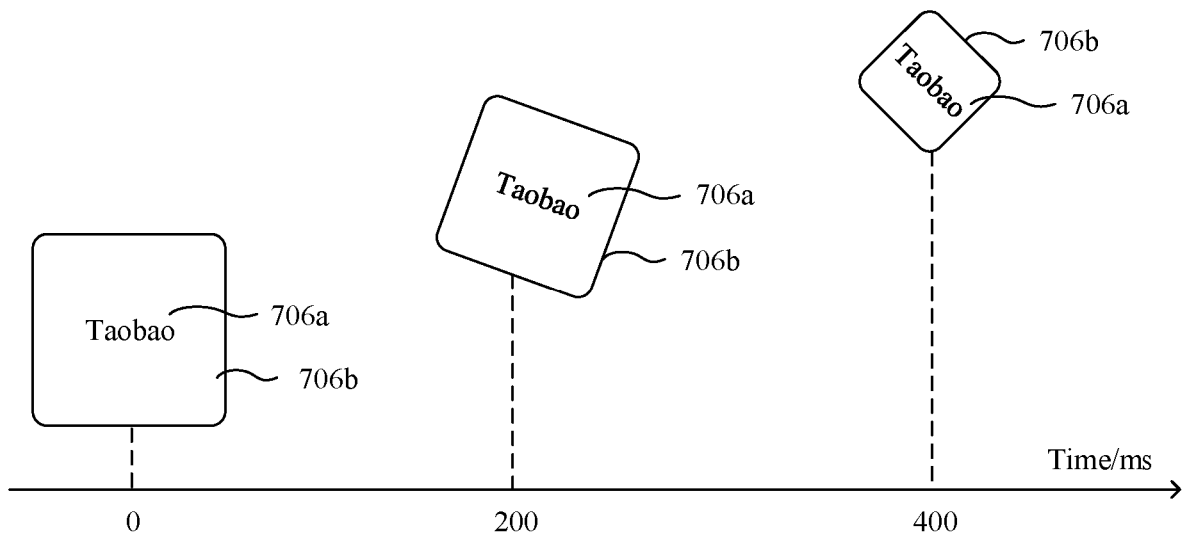
FIG. 23 is a schematic diagram 21 of an application scenario of a method for displaying an application icon according to an embodiment of this application.

For example, as shown in FIG. 23, the first deletion effect may be: gradually shrinking the foreground-layer icon 706a to 0 and rotating the foreground-layer icon 706a by 60° within 500 ms. The second deletion effect may be: gradually shrinking the background-layer icon 706b to 0 and rotating the background-layer icon 706b by 80° within 500 ms. In this way, during deletion of the application icon 706, the mobile phone may present a visual effect of separately deleting the foreground-layer icon 706a and the background-layer icon 706b.

In some embodiments, a specific delay may be further set between displaying the first deletion effect and displaying the second deletion effect by the mobile phone. For example, after detecting that the user taps the deletion badge 2201, the mobile phone may first display the first deletion effect for the foreground-layer icon 706a, and when the first deletion effect is played to the $100^{th}$ ms, the mobile phone starts to display the second deletion effect for the background-layer icon 706b. In this way, during deletion of the application icon 706, the mobile phone may present a visual effect of sequentially deleting the foreground-layer icon 706a and the background-layer icon 706b.

Certainly, if the application icon 706 further includes icons of other layers (such as a mask in a mask layer), during deletion of the application icon 706, the mobile phone may also respectively add deletion effects to icons of different layers according to the foregoing method, so as to present a visual effect of staggered movement during deletion of the application icon.

In some embodiments, when an application receives a new message, the mobile phone may display a corresponding badge on an application icon of the application in the launcher, so as to indicate a quantity of current unread messages. In this case, the mobile phone may display preset new message effects respectively for a foreground-layer icon and a background-layer icon of the application icon, so that when the application receives a new message, the application icon of the application may present a visual effect of staggered movement.

Figure 24:
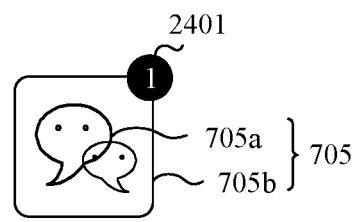
FIG. 24 is a schematic diagram 22 of an application scenario of a method for displaying an application icon according to an embodiment of this application.

For example, as shown in FIG. 24, the application icon 705 of the WeChat app includes a foreground-layer icon 705a and a background-layer icon 705b. A badge 2401 on the application icon 705 may be used to indicate a quantity of current unread WeChat messages. When the WeChat app receives a new WeChat message, the mobile phone needs to change a value of the badge 2401 from 1 to 2.

In this case, the mobile phone may display the foreground-layer icon 705a of the application icon 705 based on a first new message effect, and the mobile phone may display the background-layer icon 705b of the application icon 705 based on a second new message effect. The first new message effect and the second new message effect may be the same or different.

Figure 25:
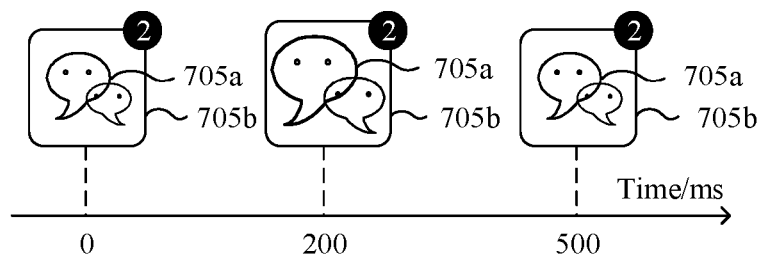
FIG. 25 is a schematic diagram 23 of an application scenario of a method for displaying an application icon according to an embodiment of this application.

For example, as shown in FIG. 25, the first new message effect may be: gradually magnifying the foreground-layer icon 705a to 120% within 0 to 200 ms, and gradually shrinking the foreground-layer icon 705a to 100% within 200 to 500 ms. The second new message effect may be: gradually magnifying the background-layer icon 705b by 110% within 0 to 200 ms, and gradually shrinking the background-layer icon 705b to 100% within 200 to 500 ms. In this way, when the badge of the application icon 705 changes, the mobile phone may add new message effects respectively to the foreground-layer icon 706a and the background-layer icon 706b, so as to present a staggered movement effect of the application icon 705, thereby attracting the user's attention and prompting the user to receive a new message.

In some embodiments, a specific delay may be set between displaying the first new message effect and displaying the second new message effect by the mobile phone. For example, after detecting that the WeChat app receives a new message, the mobile phone may first display the first new message effect for the foreground-layer icon 706a, and when the first new message effect is played to the $100^{th}$ ms, the mobile phone starts to display the second new message effect for the background-layer icon 706b.

Certainly, if the application icon 705 further includes icons of other layers (such as a mask in a mask layer), when displaying receiving of a new message by the application icon 706, the mobile phone may also respectively add new message effects to icons of different layers according to the foregoing method, so as to present a visual effect of staggered movement of the application icon of the application when the application receives a new message.

An embodiment of this application discloses an electronic device, including a processor, and a memory, an input device, and an output device that are connected to the processor. The input device and the output device may be integrated into one device. For example, a touch sensor may be used as an input device, a display may be used as an output device, and the touch sensor and the display may be integrated into a touchscreen.

Figure 26:
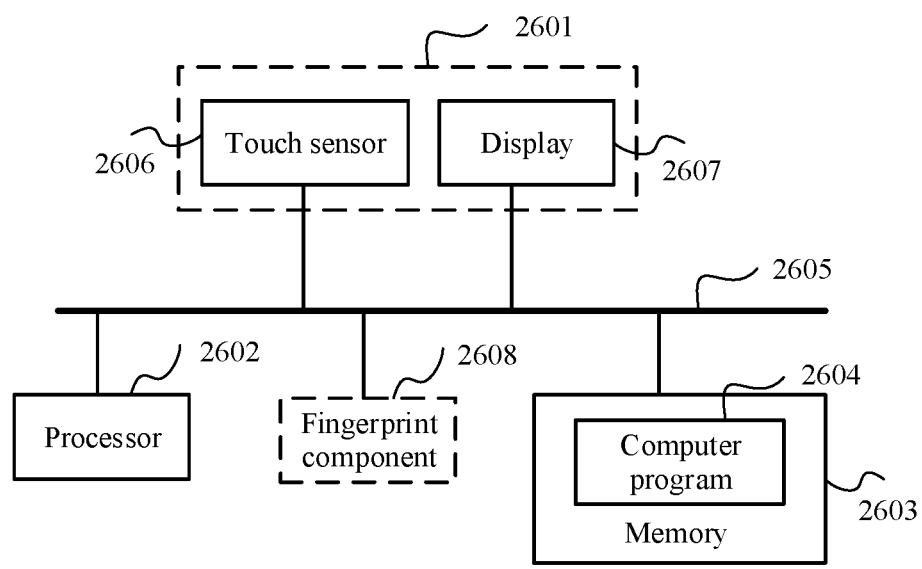
FIG. 26 is a schematic diagram 2 of a structure of an electronic device according to an embodiment of this application.

As shown in FIG. 26, the electronic device may include: a touchscreen 2601, where the touchscreen 2601 includes a touch sensor 2606 and a display 2607; one or more processors 2602; a memory 2603; one or more applications (not shown); and one or more computer programs 2604. The foregoing devices may be connected through one or more communication buses 2605. Optionally, the electronic device may further include a fingerprint component 2608. The fingerprint component 2608 may be located below the touchscreen 2601, and may be configured to collect a fingerprint entered by a user at an unlock position of the touchscreen 2601.

The one or more computer programs 2604 are stored in the memory 2603, and are configured to be executed by the one or more processors 2602. The one or more computer programs 2604 include instructions, and the instructions may be used to perform steps in the foregoing embodiments. All related content of the steps in the foregoing method embodiments may be cited in function descriptions of corresponding physical devices. Details are not described herein again.

For example, the processor 2602 may be specifically the processor 110 shown in FIG. 1, the memory 2603 may be specifically the internal memory 121 shown in FIG. 1, and the display 2607 may be specifically the display 194 shown in FIG. 1. The touch sensor 2606 may be specifically a touch sensor in the sensor module 180 shown in FIG. 1, and the fingerprint component 2608 may be specifically a fingerprint component in the sensor module 180 shown in FIG. 1. This is not limited in this embodiment of this application.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

Functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An electronic device, comprising:
one or more processors;
a memory, wherein
the memory stores computer-executable instructions, and when the instructions are executed by the one or more processors of the electronic device, the electronic device is caused to perform the following:
displaying a first screen page of a desktop, wherein the first screen page comprises N application icons, the N application icons comprise a first application icon and at least two first-layer application icons, and each of the at least two first-layer application icons is located around the first application icon and adjacent to the first application icon; N is an integer greater than or equal to 3;
receiving an operation of a user related to the first application icon; and
in response to the operation, displaying the at least one first-layer application icon in a first display manner, wherein the first display manner comprises that the at least two first-layer application icons move relative to the first application icon, to present that the at least two first-layer application icons are attracted or popped off by the first application icon.

2. The electronic device according to claim 1, wherein the at least two first-layer application icons are at least two of a second application icon, a third application icon, a fourth application icon, and a fifth application icon; and;
the second application icon is located on a left side of the first application icon, the third application icon is located on a right side of the first application icon, the fourth application icon is located above the first application icon, and the fifth application icon is located below the first application icon.

3. The electronic device according to claim 2, wherein the at least two first-layer application icons are the second application icon, the third application icon, the fourth application icon, and the fifth application icon.

4. The electronic device according to claim 1, wherein the at least two first-layer application icons are at least two of a sixth application icon, a seventh application icon, an eighth application icon, and a ninth application icon; and the sixth application icon is located at an upper left corner of the first application icon, the seventh application icon is located at a lower left corner of the first icon, the eighth application icon is located at an upper right corner of the first icon, and the ninth application icon is located at a lower right corner of the first icon.

5. The electronic device according to claim 4, wherein the at least two first-layer application icons are the sixth application icon, the seventh application icon, the eighth application icon, and the ninth application icon.

6. The electronic device according to claim 1, wherein the one or more processors are further configured to execute the instruction which cause the electronic device to perform:
after the at least two first-layer application icons are displayed in the first display manner, restoring positions of the at least two first-layer application icons.

7. The electronic device according to claim 1, wherein the N application icons of N applications further comprise at least one second-layer application icon, and the at least two first-layer application icons are located between the first application icon and the at least one second-layer application icon; and the one or more processors are further configured to execute the instruction which cause the electronic device to perform:
displaying the at least two first-layer application icons and the at least one second-layer application icon in the first display manner in response to the operation.

8. The electronic device according to claim 1, wherein the operation is opening, moving or deleting an application program corresponding to the first application icon.

9. The electronic device according to claim 1, wherein the first application icon is a contact application icon, a browser application icon, an instant chat application icon, or a social application icon.

10. A method for operating an application icon, wherein the method which is applied to an electronic device comprises:
displaying a first screen page of a desktop, wherein the first screen page comprises N application icons, the N application icons comprise a first application icon and at least two first-layer application icons, and each of the at least two first-layer application icons is located around the first application icon and adjacent to the first application icon; and N is an integer greater than or equal to 3;
receiving an operation of a user related to the first application icon; and
in response to the operation, displaying the at least two first-layer application icons in a first display manner, wherein the first display manner comprises that the at least two first-layer application icons move relative to the first application icon, to present that the at least two first-layer application icons are attracted or popped off by the first application icon.

11. The method according to claim 10, wherein the at least two first-layer application icons are at least one of a second application icon, a third application icon, a fourth application icon, and a fifth application icon; and
the second application icon is located on a left side of the first application icon, the third application icon is located on a right side of the first application icon, the fourth application icon is located above the first application icon, and the fifth application icon is located below the first application icon.

12. The method according to claim 10, wherein the at least two first-layer application icons are at least one of a sixth application icon, a seventh application icon, an eighth application icon, and a ninth application icon; and
the sixth application icon is located at an upper left corner of the first application icon, the seventh application icon is located at a lower left corner of the first icon, the eighth application icon is located at an upper right corner of the first icon, and the ninth application icon is located at a lower right corner of the first icon.

13. The method according to claim 10, further comprising:
after the at least two first-layer application icon are displayed in the first display manner, restoring positions of the at least two first-layer application icons.

14. The method according to claim 10, wherein the N application icons of N applications further comprise at least one second-layer application icon, and the at least two first-layer application icons are located between the first application icon and the at least one second-layer application icon; and the method further comprises:
displaying the at least two first-layer application icons and the at least one second-layer application icon in the first display manner in response to the operation.

15. The method according to claim 10, wherein the operation is opening, moving or deleting an application program corresponding to the first application icon.

16. The method according to claim 10, wherein the first application icon is a contact application icon, a browser application icon, an instant chat application icon, or a social application icon.

17. The method according to claim 11, wherein the at least two first-layer application icons are the second application icon, the third application icon, the fourth application icon, and the fifth application icon.

18. The method according to claim 12, wherein the at least two first-layer application icons are the sixth application icon, the seventh application icon, the eighth application icon, and the ninth application icon.

* * * * *